US012713198B2

(12) United States Patent
Silzle et al.

(10) Patent No.: US 12,713,198 B2
(45) **Date of Patent: *Aug. 18, 2026**

(54) CONCEPTS FOR AURALIZATION USING EARLY REFLECTION PATTERNS

(71) Applicant: FRAUNHOFER-GESELLSCHAFT ZUR FOERDERUNG DER ANGEWANDTEN FORSCHUNG E.V., Munich (DE)

(72) Inventors: Andreas Silzle, Erlangen (DE); Juergen Herre, Erlangen (DE); Dennis Rosenberger, Erlangen (DE); Jouni Paulus, Erlangen (DE); Christian Borss, Erlangen (DE); Alexander Adami, Erlangen (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 125 days.

This patent is subject to a terminal disclaimer.

(21) Appl. No.: 18/658,071

(22) Filed: May 8, 2024

(65) Prior Publication Data

US 2025/0350901 A1 Nov. 13, 2025

Related U.S. Application Data

(63) Continuation of application No. PCT/EP2022/081092, filed on Nov. 8, 2022.

(30) Foreign Application Priority Data

Nov. 9, 2021 (EP) .................................... 21207274

(51) Int. Cl.
*H04S 7/00* (2006.01)

(52) U.S. Cl.
CPC ........... *H04S 7/303* (2013.01); *H04S 2400/11* (2013.01); *H04S 2400/13* (2013.01); *H04S 2420/01* (2013.01); *H04S 2420/03* (2013.01)

(58) Field of Classification Search
CPC .. H04S 7/303; H04S 2400/01; H04S 2400/03; H04S 2400/11; H04S 2400/13
See application file for complete search history.

(56) References Cited

U.S. PATENT DOCUMENTS

| | | |
|---|---|---|
| 4,817,149 A | 3/1989 | Myers |
| 8,670,850 B2 | 3/2014 | Soulodre |

(Continued)

FOREIGN PATENT DOCUMENTS

| | | |
|---|---|---|
| CN | 106576203 B | 2/2020 |
| CN | 112106385 A | 12/2020 |

(Continued)

OTHER PUBLICATIONS

U.S. Appl. No. 18/655,897, Early Reflection Concept for Auralization, filed May 6, 2024.

(Continued)

*Primary Examiner* — James K Mooney
(74) *Attorney, Agent, or Firm* — Perry + Currier Inc.

(57) ABSTRACT

The present application concerns early reflection processing concepts for auralization. Embodiments relate to apparatuses and methods for sound rendering considering early reflections and to apparatuses and methods for determining an early reflection pattern.

30 Claims, 27 Drawing Sheets

(56) References Cited

U.S. PATENT DOCUMENTS

| | | | |
|---|---|---|---|
| 8,805,561 | B2 | 8/2014 | Wilcock et al. |
| 9,462,387 | B2 | 10/2016 | Oomen et al. |
| 10,524,080 | B1 | 12/2019 | Johnson et al. |
| 10,771,912 | B2 | 9/2020 | Jax et al. |
| 2001/0024504 | A1 | 9/2001 | Jot et al. |
| 2003/0007648 | A1 | 1/2003 | Currell |
| 2008/0273708 | A1 | 11/2008 | Sandgren et al. |
| 2012/0288124 | A1 | 11/2012 | Fejzo et al. |
| 2013/0272527 | A1 | 10/2013 | Oomen et al. |
| 2015/0350801 | A1 | 12/2015 | Koppens et al. |
| 2016/0255453 | A1 | 9/2016 | Fueg et al. |
| 2017/0078820 | A1 | 3/2017 | Brandenburg et al. |
| 2018/0115787 | A1 | 4/2018 | Koo et al. |
| 2019/0356999 | A1 | 11/2019 | Raghuvanshi et al. |
| 2019/0387350 | A1 | 12/2019 | Audfray et al. |
| 2020/0037091 | A1 | 1/2020 | Jeon et al. |
| 2021/0195363 | A1 | 6/2021 | Honma et al. |
| 2021/0266693 | A1 | 8/2021 | Raghuvanshi et al. |
| 2021/0329381 | A1 * | 10/2021 | Holman ................ G10L 19/008 |
| 2021/0398545 | A1 | 12/2021 | Johnson et al. |
| 2022/0046375 | A1 | 2/2022 | Schmidt et al. |

FOREIGN PATENT DOCUMENTS

| | | | | |
|---|---|---|---|---|
| EP | 0276159 | A2 | 7/1988 | |
| EP | 0276159 | A3 | 7/1988 | |
| EP | 3588989 | A1 | 1/2020 | |
| GB | 2255884 | B | 5/1995 | |
| GB | 2607556 | A * | 12/2022 | ............ H04S 7/302 |
| JP | 5857071 | B2 | 2/2016 | |
| JP | 2021527354 | A | 10/2021 | |
| KR | 20080098307 | A | 11/2008 | |
| RU | 2595943 | C2 | 8/2016 | |
| RU | 2642376 | C2 | 1/2018 | |
| RU | 2736274 | C1 | 11/2020 | |
| TW | 1700937 | B | 8/2020 | |
| WO | WO-2008135310 | A2 | 11/2008 | |
| WO | WO-2019078035 | A1 | 4/2019 | |
| WO | WO-2021186102 | A1 | 9/2021 | |

OTHER PUBLICATIONS

U.S. Appl. No. 18/658,221, Early Reflection Pattern Generation Concept for Auralization, filed May 8, 2024.

Favrot, Sylvain et al. "Validation of a loudspeaker-based room auralization system using speech intelligibility measures." Audio Engineering Society Convention 126. Audio Engineering Society, 2009.

Coleman, Philip, et al. "On object-based audio with reverberation." Audio Engineering Society Conference: 60th International Conference: DREAMS (Dereverberation and Reverberation of Audio, Music, and Speech). Audio Engineering Society, 2016.

Gerzon, Michael A. "The design of distance panpots." Audio Engineering Society Convention 92. Audio Engineering Society, 1992.

Hacihabiboglu, Hüseyin et al. "Perceptual simplification for model-based binaural room auralisation." Applied Acoustics 69.8 (2008): 715-727.

Li, Song et al. "Externalization Enhancement for Headphone-Reproduced Virtual Frontal and Rear Sound Images." Audio Engineering Society Conference: 2019 AES International Conference on Headphone Technology. Audio Engineering Society, 2019.

Jot, Jean-Marc et al. "Augmented reality headphone environment rendering." Audio Engineering Society Conference: 2016 AES International Conference on Audio for Virtual and Augmented Reality. Audio Engineering Society, 2016.

Yuan, Yougen, et al. "Sound image externalization for headphone based real-time 3D audio." Frontiers of Computer Science 11 (2017): 419-428.

ISA/EP, PCT International Search Report and Written Opinion, Feb. 17, 2023 re PCT International Patent Application No. PCT/EP2022/081089.

Jot, Jean-Marc. "Real-time spatial processing of sounds for music, multimedia and interactive human-computer interfaces." Multimedia systems 7.1 (1999): 55-69.

Jullien, J. P., et al. "Some results on the objective and perceptual characterization of room acoustical quality in both laboratory and real environments." Proc. Institute of Acoustics, XIV (1992).

Jot Jean-Marc, et al. "Binaural concert hall simulation in real time." IEEE Mohonk workshop. 1993.

Carpentier, Thibaut. "A new implementation of Spat in Max." 15th Sound and Music Computing Conference (SMC2018). 2018.

Vaananen, Riitta et al. "Advanced AudioBIFS: Virtual acoustics modeling in MPEG-4 scene description." IEEE Transactions on Multimedia 6.5 (2004): 661-675.

Brinkmann, Fabian, et al. "Towards encoding perceptually salient early reflections for parametric spatial audio rendering." Audio Engineering Society Convention 148. Audio Engineering Society, 2020.

Brinkmann, F., et al., A Round Robin on Room Acoustical Simulation and Auralization. J. Acoust. Soc. Am., 2019. 145(4): p. 2746..2760 DOI: https://doi.org/10.1121/1.5096178.

Renkus-Heinz, "Ease—Version 4.3", (Oct. 1, 2009), pp. 1-281, URL: https://www.afmg.eu/sites/default/files/2021-07/EASE_4.3_Tutorial_English.pdf, (Feb. 20, 2023).

Rindel, Jens Holger, "Computer Simulation Techniques for Acoustical Design of Rooms", Acoustics Australia, Australian Acoustical Society, AU, (Jan. 1, 1995), vol. 23, No. 3, ISSN 0814-6039, pp. 81-86.

Bregman, A.S.," Auditory Scene Analysis (The Perceptual Organization of Sound)". 1990, MIT Press. ISBN: 9780262022972. pp. 641-705.

Blauert, J., Spatial Hearing, "The Psychophysics of Human Sound Localization". 2nd ed. 1997, Cambrigde Massachusetts: MIT Press. ISBN: 0-262-02413-6 pp. 201-287; 408-422.

Angus, J. A. S. "The Effects of Specular Versus Diffuse Reflections on the Frequency Response at the Listener." Journal of the Audio Engineering Society 49.3 (2001).

Barron, Michael et al. "Spatial impression due to early lateral reflections in concert halls: the derivation of a physical measure." Journal of sound and Vibration 77.2 (1981): 211-232.

Bech, Søren. "Perception of reproduced sound: Audibility of individual reflections in a complete sound field." Audio Engineering Society Convention 96. Audio Engineering Society, 1994.

Kuttruff, H., Room Acoustics (fourth edition). 2000: Spon Press. ISBN: 0-419-24580-4.

Best, Virginia et al., "Sound externalization: A review of recent research", Trends in Hearing vol. 24, 2020.

* cited by examiner

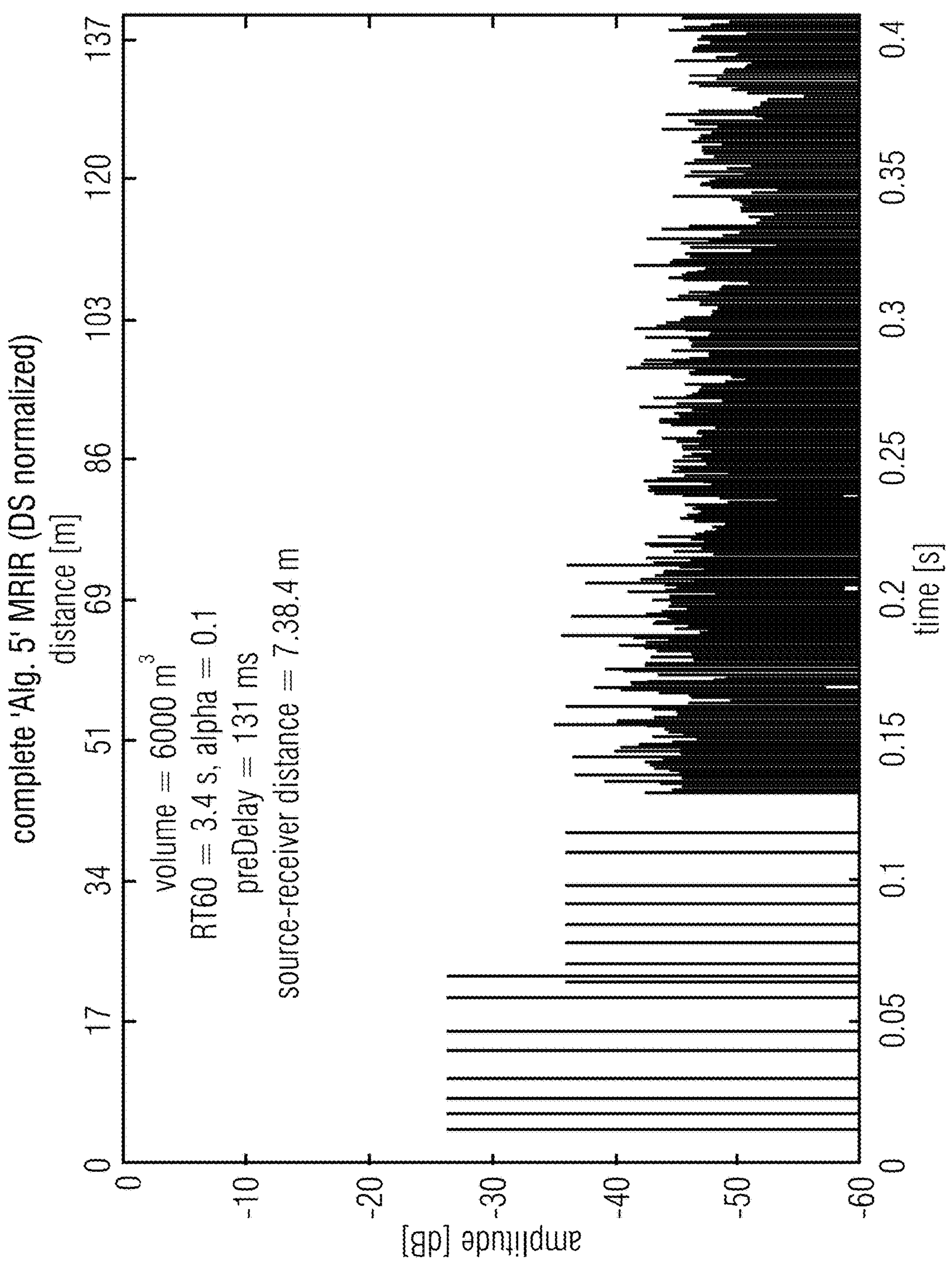
Fig. 25 (Part 1)

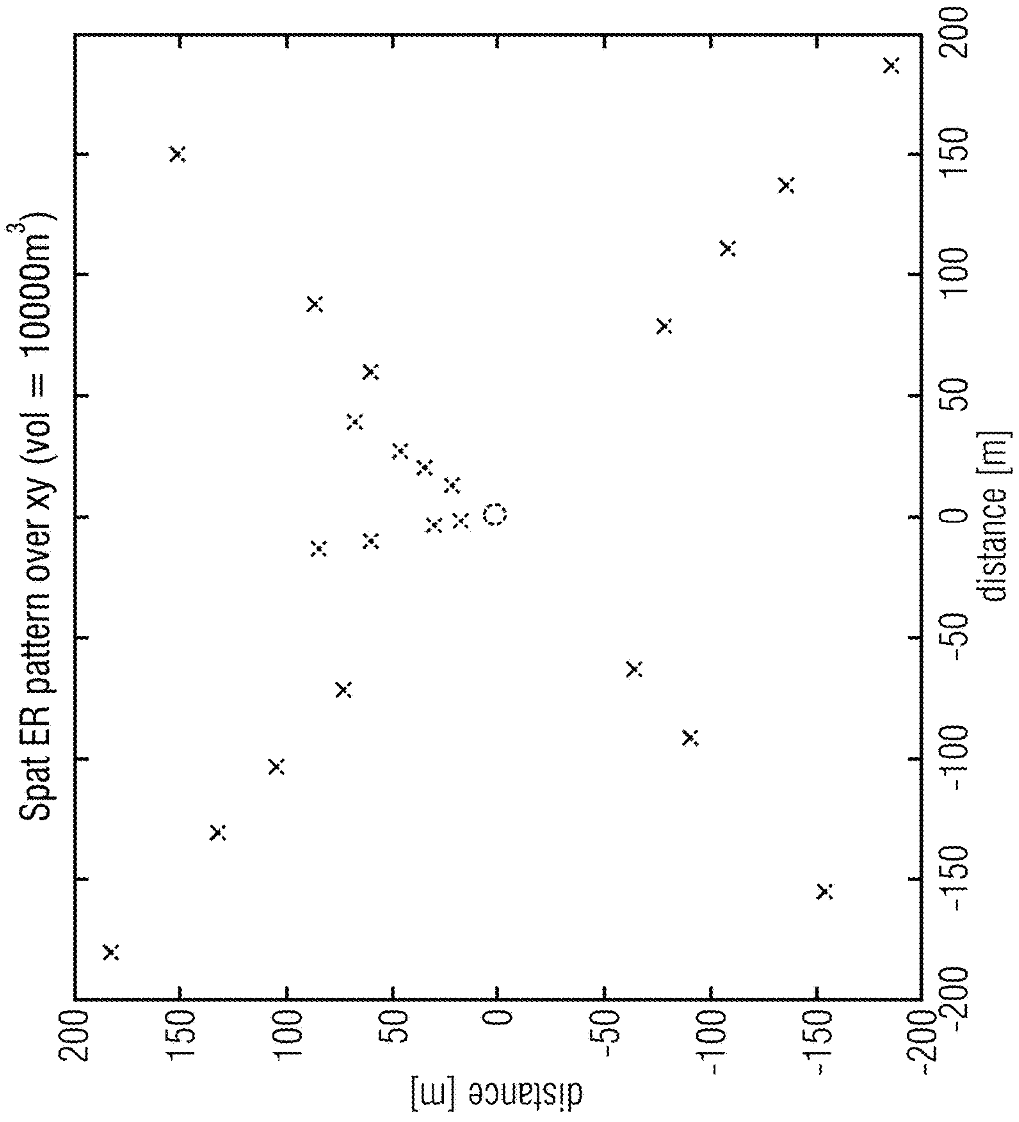
Fig. 25 (Part 2)

CONCEPTS FOR AURALIZATION USING EARLY REFLECTION PATTERNS

CROSS-REFERENCE TO RELATED APPLICATIONS

This application is a continuation of copending International Application No. PCT/EP2022/081092, filed Nov. 8, 2022, which is incorporated herein by reference in its entirety, and additionally claims priority from European Application No. 21207274.8, filed Nov. 9, 2021, which is also incorporated herein by reference in its entirety.

TECHNICAL FIELD

The present application is concerned with early reflection processing concepts for auralization.

BACKGROUND OF THE INVENTION

A room impulse response (RIR) describes the relationship between a sound source in an acoustic environment (a room) and the receiver (i.e. the listener). It specifies the room's response to a unit impulse in time domain and corresponds to the room transfer function in frequency domain. It consists of the direct sound path, the early reflections (ERs) and the diffuse late reverberation.

In binaural (or loudspeaker) rendering for virtual and augmented reality (VR/AR) applications, the room impulse response from a particular source and listener location may change considerably. In 6-Degrees-of-Freedom (6DOF) VR/AR applications, the listener can usually move freely within the entire scene, resulting in a permanently changing room impulse response. Consequently, a tremendous amount of computation has to be spent to determine each reflection from the source to the listener, taking into consideration the geometry of walls, occluding objects and other effects to compute a physically accurate reflection pattern.

It is the observation of this invention that the exact acoustic reproduction of the early reflection (ER) pattern in a room is not required to make a perceptually convincing rendering and that this can be done in a way that largely abstracts from the exact geometric details of the room. In this way, a lot of computation can be saved. In case the reflection pattern has to be transmitted from an encoder to a renderer, a considerable part of the side information associated with efficiently computing reflections depending on the listener position can be saved as compared to the state of the art in regular geometry-based rendering.

The document [1] concerns a replacement of exactly calculated "real" ER by a more general Simple ER pattern. The idea of this was to find, describe and simulate the perceptually orthogonal parameters describing small or large sound sources (e.g. orchestra) on a stage of a large room (e.g. concert hall), [2, 3] and play them back over a loudspeaker setup (e.g. stereo) or binaurally over headphone. A composer or sound engineer was able to use these parameters (like source presence, source warmth, source brilliance, room presence, running reverberation, envelopment and reverberance) to set up a scene. The SPAT software has been used over a long time for such kind of productions, [4]. The approach was also adopted in the ISO MPEG-4 standardization [5].

In a dynamic 6DOF environment the acoustic description of rooms (dimensions, RT60, . . . ) can vary to a considerable amount. The source and receiver position are fully free and will be calculated in real-time for auralization. Perceptual parameters, which are highly dependent on these changing physical setups cannot be defined as constants and are therefore not appropriate for this task.

The invention here has the new approach to take just few basic physical parameters of the environment to select and adjust simple basic ER pattern. This has the following advantages: No specific sound engineering background is necessary to define the parameters. They come directly from the physical model. The used Simple ER pattern is adaptive to different room sizes and different RT60 values. Even for outdoor environments, Simple ER patterns are defined, which was not the case in SPAT. The perceptual degradation with this approach relative to a full physically correct simulation is limited because the human auditory system is not able to analyze the fine structure of the early reflections, e.g. [6].

In the following, newly invented Simple ER patterns, room acoustic parameters are used, like RT60, predelay time, room volume or room dimensions, and frequency dependency of RT60. The ER pattern is specifically defined to produce a smooth transition between the direct sound and the late reverb. It should be frequency neutral and the proximity to walls and openings of the source and receiver.

It is the idea to produce a plausible and convincing perception of the listener, fitting to the overall room acoustical parameters. This is enough for most of the cases, because the listener has no direct comparison possibility to the "real" physically exact ER.

The computational consuming exact geometrical calculation of ER, especially with visibility checks, can be avoided, especially in applications like real-time auditory virtual environment and augmented reality. The exact calculation of "real" ER is also sometimes difficult and sensitive to produce artifacts by appearing and disappearing ERs, depending on the exact (and time-varying) location of the source and the listener. This can be avoided by using a constant ER pattern, which has been computed once when entering of the scene or by moving from one acoustic environment to another environment, defined by different acoustic parameters.

The invention takes advantage of an encoder-bitstream-renderer scenario. In one case (a), a default Simple ER pattern can be calculated with the room acoustical parameters available in the renderer alone. These parameters are adjusted in real-time by the source-listener distance and the azimuth angle between them. In case (b), the geometry of the scene is pre-analyzed in a more advanced way in the encoder. Then the Simple ER pattern of few ERs is pre-calculated in the encoder and transmitted to the renderer in a bitstream. There it is adjusted in the same way as in case (a) by the listener distance and angle (or other information that is available at the time of rendering). These two cases give the full flexibility for an open future-proof approach, in which further analysis knowledge can be incorporated later into the encoder.

A room impulse response (RIR) describes the relationship between a sound source in an acoustic environment (a room) and the receiver (the listener) and specifies the room's response to a unit impulse, see e.g. FIG. 21. It consists of the direct sound path, the early reflections (ERs) and the diffuse late sound part. FIG. 21 shows an example for a monophonic RIR with $2^{nd}$ order ERs, generated with the acoustical room simulation program RAVEN [7].

Especially in complex physical environments/rooms, defined by many surfaces, the calculation of the geometrical correct ERs with the necessary visibility checks ("is this source in direct line-of-sight to the listener?") is very time consuming. On the other hand, it is known that the human auditory perceptions suppresses a lot of details about the ERs with regard to the direct sound (law of the first wave front, precedence effect, scene analysis, [8, 9]) and that therefore a precise modeling of the ER part of the impulse response is in many cases not necessary to achieve a convincing rendering quality, e.g. [6]. The auditory system uses the ERs to determine or refine several perceptual attributes. Among them are:

Position of the source relative to the receiver
Source-receiver distance
Auditory source width (ASW)
Level and frequency dependent absorption of boundaries
Proximity to close boundaries There are several approaches known to simplify ER calculation. The first one is just to avoid the calculation of the ER completely, i.e. render sound without simulated ER, i.e. render only direct sound and late reverb, see FIG. 22. The late reverb starts at the so-called predelay time. FIG. 22 shows a RIR with direct sound and late reverb starting at predelay time 0.13 s, no ER.

The next possibility is to calculate only geometrically exact $1^{st}$ order reflections, see FIG. 23. In a shoebox shaped room this reduces the number of ER from about 27 to 6. FIG. 23 shows a RIR with $1^{st}$ order reflections and late reverb (left), top view (right). The square (red) is the sound source, the circle (blue) is the receiver, the line (red) connecting the circle and the square is the direct sound, further lines (blue) coming out of the circle are the reflections, the length is proportional to the logarithmic level.

The next possibility are just two ERs side by side with the direct sound, see FIG. 24. The influence of side reflections on ASW is known from concert hall acoustics, [11]. Note that this is very simple to compute compared to a true geometric simulation. FIG. 24 shows a RIR with two reflections side by side to the direct sound (left), top view (right).

In the next pattern the two side reflections are replaced by 4 reflections to each side of the direct sound and four fixed source position independent reflection sequences at [±45° and ±135°], each consisting of 4 reflections, see FIG. 25. This pattern is inspired by the SPAT algorithm [1, 5], but it does not implement all details, especially not the effect of all the input parameters. The parameters for this pattern are defined to specifically produce perceptual receiver attributes like ASW. No room acoustic properties, beside RT60, are used for it. FIG. 25 shows a RIR with "SPAT" pattern (left), top view (right). The crosses (green and blue) are ER.

The previously described approach is designed such that the input parameters, which define the ER pattern, are perceptual parameters. They should describe the listener's perception caused by the ERs. The shortcoming is that it only vaguely adapts to room related parameters. Sound engineering knowledge and experience is used to set the perceptual defined parameters, like source presence, source warmth, source brilliance, room presence, running reverberation, envelopment and reverberance. This is a clear disadvantage for designers defining the physical properties of a real-time VR/AR system and having no perceptual sound engineering experience. Especially for VR applications, the geometry of the virtual physical space is often known quite well as a by-product of the visualization process. Also, there is no ER pattern for outdoor environments known with the SPAT algorithm.

The object of the invention is to avoid the shortcomings of the state of the art by explicitly using room acoustical and physical parameters to define the ER pattern. Furthermore, different patterns are defined depending on the room properties, and are even suitable for outdoor environments (where a precise description of the geometry is difficult). The patterns have different numbers of ERs dependent on room size or other physical parameters.

The new ER patterns feature perceptually plausible rendering compared to "real" ERs
reduced computational complexity compared to a "real" ER calculation
adaptation of the ER pattern dependent on the physical room properties do not require any specific sound engineering skill and experience to set necessary parameters
distinct ER patterns for indoor and outdoor
no additional side information needed (for an encoder/bitstream/renderer scenario including transmission of a bitstream), in the case that the predefined patterns are calculated within the renderer
very little additional side information needed (for an encoder/bitstream/renderer scenario including transmission of a bitstream), in the case that the predefined patterns are calculated in the encoder from the scene geometry This is achieved by using parameterizable but fixed spatial ER patterns that do not depend on the exact geometry of the room. In an embodiment of the invention, the pattern also does not depend on the listener position in the room. Instead, only one (or a few) global characteristic parameters are used to configure the ER pattern. In this way, the pattern can be rendered extremely efficiently.

In the following newly invented ER patterns, specifically room acoustic parameters are used like RT60, predelay time, room dimensions or room volume, frequency dependency of RT60 for pattern configuration. The ER pattern is defined in a way to produce a (temporally) smooth transition between the direct sound and the late reverb. It should be of neutral timbre. It is dependent on room volume and surface. It is not dependent on the position of the source and receiver in the room.

It is the objective of the invention to produce a plausible and convincing perception by the listener, fitting to the overall room acoustical parameters. This is sufficient for most use cases, especially since the listener has no possibility for a direct comparison with a rendering of the "real" physically correct ER.

SUMMARY

An embodiment may have an apparatus for determining an early reflection pattern for sound rendition, configured to receive at least one room acoustical parameter which is representative of an acoustical characteristic of an acoustic environment; determine an early reflection pattern which is indicative of a constellation of early reflection positions, by parameterizing one or more spiral functions centered at the listener position, and placing the early reflection positions using the one or more spiral functions.

Another embodiment may have an apparatus for sound rendering, configured to receive first information on a listener position and a sound source position; render an audio signal of the sound source using a room impulse response whose early reflection portion is determined by an early reflection pattern which is indicative of a constellation of early reflection positions, and which is positioned at the listener position in a manner so that the early reflection positions are located around the listener position and at angular directions from the listener position which are invariant with respect to changes in listener head orientation, the apparatus having an apparatus for determining the early reflection pattern as mentioned above.

Another embodiment may have a bitstream for being subject to sound rendition as mentioned above.

Still another embodiment may have a digital storage medium storing a bitstream for being subject to sound rendition as mentioned above.

According to another embodiment, a method for determining an early reflection pattern for sound rendition may have the steps of: receiving at least one room acoustical parameter which is representative of an acoustical characteristic of an acoustic environment; determining an early reflection pattern which is indicative of a constellation of early reflection positions, by parameterizing one or more spiral functions centered at the listener position, and placing the early reflection positions using the one or more spiral functions.

According to another embodiment, a method for sound rendering may have the steps of: receiving first information on a listener position and a sound source position; rendering an audio signal of the sound source using a room impulse response whose early reflection portion is determined by an early reflection pattern which is indicative of a constellation of early reflection positions, and which is positioned at the listener position in a manner so that the early reflection positions are located around the listener position and at angular directions from the listener position which are invariant with respect to changes in listener head orientation, the method having the above method for determining the early reflection pattern.

Another embodiment may have a non-transitory digital storage medium having stored thereon a computer program for performing a method for determining an early reflection pattern for sound rendition having the steps of: receiving at least one room acoustical parameter which is representative of an acoustical characteristic of an acoustic environment; determining an early reflection pattern which is indicative of a constellation of early reflection positions, by parameterizing one or more spiral functions centered at the listener position, and placing the early reflection positions using the one or more spiral functions, when the computer program is run by a computer.

Still another embodiment may have a non-transitory digital storage medium having stored thereon a computer program for performing a method for sound rendering having the steps of: receiving first information on a listener position and a sound source position; rendering an audio signal of the sound source using a room impulse response whose early reflection portion is determined by an early reflection pattern which is indicative of a constellation of early reflection positions, and which is positioned at the listener position in a manner so that the early reflection positions are located around the listener position and at angular directions from the listener position which are invariant with respect to changes in listener head orientation, the method having the above method for determining the early reflection pattern, when the computer program is run by a computer.

In accordance with a first aspect of the present invention, the inventors of the present application realized that one problem encountered when trying to use early reflection (ER) rendering of audio signal stems from the fact that the early reflections depend on a relationship between a source position and a listener position. The inventors found, that it is possible to consider a source position independent ER pattern without, e.g., floor reflection; so that ER rendering gets easier while the rendering result is still pretty good. The early reflection portion of the room impulse response used for the rendering, is exclusively determined by an early reflection pattern. A spatial relationship between a sound source and the listener is not considered for the early reflection portion of the room impulse response. Further the early reflection positions in the early reflection pattern are invariant with respect to changes in a listener head orientation. This is based on the finding that the same ER pattern can be used for determining the early reflection portion of the room impulse response independent whether the listener looks to the sound source or in any other direction.

Accordingly, in accordance with a first aspect of the present application, an apparatus for sound rendering is configured to receive information on a listener position and a sound source position. The apparatus is configured to render an audio signal of the sound source using a room impulse response whose early reflection portion is exclusively determined by an early reflection pattern. The early reflection pattern is indicative of a constellation, e.g. constellation shall denote a set of positions along with defining their mutual placement in terms of the angles between the lines connecting the positions; a synonymous term shall be “pattern”, of early reflection positions. The early reflection pattern is positioned at the listener position in a manner so that the early reflection positions are located around the listener position and at angular directions from the listener position which are invariant with respect to changes in a listener head orientation, i.e. the constellation is translatorily placed at the listener position.

In accordance with a second aspect of the present invention, the inventors of the present application realized that one problem encountered when trying to use early reflection (ER) rendering of audio signal stems from the fact that the early reflection patterns for outdoor environments are highly individual and dependent on the physical setup of the scene. The inventors found, that ER pattern generated using moderate analysis of an environment can result into an acoustically convincing, but computationally moderate ER rendering result.

Accordingly, in accordance with a second aspect of the present application, an apparatus for determining an early reflection pattern for sound rendition is configured to perform a geometric analysis of an acoustic environment by, at each of one or more analysis positions, determining a function indicative, for each of different distances from the respective analysis position, a value representative of an early reflection contribution; and by inspecting the function or a further function derived therefrom with respect to one or more maxima to derive one or more control parameters. Additionally, the apparatus is configured to determine an early reflection pattern, which is indicative of a constellation of early reflection positions, by placing the early reflection positions using the one or more control parameters.

In accordance with a third aspect of the present invention, the inventors of the present application realized that one problem encountered when trying to use early reflection (ER) rendering of audio signal stems from the fact that a transmission of early reflection patterns of the audio scenes for the rendering may result in high signaling costs. The inventors found, that ER pattern can be generated by use of bitstream hints resulting into an acoustically convincing, but computationally moderate ER rendering result. By using only hints in the bitstream, the signaling costs can be reduced, since it is not necessary to transmit the complete ER pattern.

Accordingly, in accordance with a third aspect of the present application, an apparatus for sound rendering is configured to receive first information on a listener position and a sound source position. The apparatus is configured to receive a bitstream comprising, e.g. and read therefrom, a representation of an audio signal of a sound source positioned at the sound source position and one or more early reflection pattern parameters. For example, the bitstream is audio bitstream with the early reflection parameter inside a header or metadata field of the bitstream, or a file format stream with the early reflection parameter inside a packet of the file format stream and a track of the file format stream comprising an audio bitstream representing the audio signal. Additionally, the apparatus is configured to determine an early reflection pattern, which is indicative of a constellation of early reflection positions, depending on the one or more early reflection pattern parameters. Further, the apparatus is configured to render the audio signal of the sound source using a room impulse response whose early reflection portion is determined by an early reflection pattern. The early reflection pattern is indicative of a constellation, e.g. constellation shall denote a set of positions along with defining their mutual placement in terms of the angles between the lines connecting the positions; an synonymous term shall be "pattern", of early reflection positions. The early reflection pattern is positioned at the listener position in a manner so that the early reflection positions are located around the listener position and at angular directions from the listener position which are invariant with respect to changes in listener head orientation, i.e. the constellation is translatorily placed at the listener position.

In accordance with a fourth aspect of the present invention, the inventors of the present application realized that one problem encountered when trying to use early reflection (ER) rendering of audio signal stems from the fact that a tremendous amount of computation has to be spent to determine each reflection from the source to the listener, taking into consideration the geometry of walls, occluding objects and other effects to compute a physically accurate reflection pattern. The inventors found, that simple room acoustical parameters, like room dimension, room volume or predelay, can be used to determine the number of early reflection positions within an early reflection pattern. It is not needed to analyze the real early reflection of the scene, since the early reflections can be approximated dependent on a room acoustical parameter. The inventors found that ER pattern generation by ER number dependency on room acoustical parameter results into an acoustically convincing, but computationally moderate ER rendering result.

Accordingly, in accordance with a fourth aspect of the present application, an apparatus for determining an early reflection pattern for sound rendition is configured to receive at least one room acoustical parameter which is representative of an acoustical characteristic of an acoustic environment. The apparatus is configured to determine an early reflection pattern, which is indicative of a constellation of early reflection positions, in a manner so that a number of the early reflection positions depend on the at least one room acoustical parameter.

In accordance with a fifth aspect of the present invention, the inventors of the present application realized that one problem encountered when trying to use early reflection (ER) rendering of audio signal stems from the fact that each source is associated with a different early reflection pattern. The inventors found, that it is not necessary to use different ER pattern for signals of different sources. This is based on the idea that the signals can be weighted and summed dependent on a source listener relationship, so that only the weighted sum of the audio signals is rendered based on the ER patter. The inventors found that ER rendition by use of a ER pattern for more than one sound source results into acoustically convincing, but computationally moderate ER rendering result.

Accordingly, in accordance with a fifth aspect of the present application, an apparatus for sound rendering is configured to receive information on a listener position, a first sound source position and a second sound source position. The apparatus is configured to render audio signal of the two sound sources using a room impulse response whose early reflection portion is determined by an early reflection pattern. The early reflection pattern is indicative of a constellation, e.g. constellation shall denote a set of positions along with defining their mutual placement in terms of the angles between the lines connecting the positions; an synonymous term shall be "pattern", of early reflection positions. The early reflection pattern is positioned at the listener position in a manner so that the early reflection positions are located around the listener position and at angular directions from the listener position which are invariant with respect to changes in listener head orientation, i.e. the constellation is translatorily placed at the listener position. The apparatus is configured to render the audio signals of the two sound sources by forming a weighted sum of a first audio signal of a first sound source positioned at the first sound source position and a second audio signal of a second sound source positioned at the second sound source position. The weighted sum weights the first audio signal more than the second audio signal, if a first distance between the first sound source position and the listener position is smaller than a second distance between the second sound source position and the listener position, and weights the second audio signal more than the first audio signal, if the first distance is larger than the second distance. Additionally, the apparatus is configured to render the audio signals of the two sound sources by generating early reflection contribution loudspeaker signals relating to the early reflection portion of the room impulse response by rendering the weighted sum from the early reflection positions.

In accordance with a sixth aspect of the present invention, the inventors of the present application realized that one problem encountered when trying to use early reflection (ER) rendering of audio signal stems from the fact that a tremendous amount of computation has to be spent to determine each reflection from the source to the listener, taking into consideration the geometry of walls, occluding objects and other effects to compute a physically accurate reflection pattern. The inventors found, that simple room acoustical parameters, like room dimension, room volume or predelay, can be used to parametrize function defining a position of the early reflections. It is not needed to analyze the real early reflection of the scene, since the early reflections can be approximated dependent on the room acoustical parameter. Further it was found that spiral functions provide a good distribution of the early reflection positions. The inventors found that ER pattern generation using one or more spiral functions results into an perceptually convincing, but computationally moderate ER rendering result.

Accordingly, in accordance with a sixth aspect of the present application, an apparatus for determining an early reflection pattern for sound rendition is configured to receive at least one room acoustical parameter which is representative of an acoustical characteristic of an acoustic environment and determine an early reflection pattern, which is indicative of a constellation of early reflection positions, by parameterizing one or more spiral functions centered at the listener position, and place the early reflection positions using the one or more spiral functions.

BRIEF DESCRIPTION OF THE DRAWINGS

The drawings are not necessarily to scale, emphasis instead generally being placed upon illustrating the principles of the invention. In the following description, various embodiments of the invention are described with reference to the following drawings, in which:

FIG. 25 shows a RIR with "SPAT" pattern (left), top view (right).

DETAILED DESCRIPTION OF THE INVENTION

Figure 1:
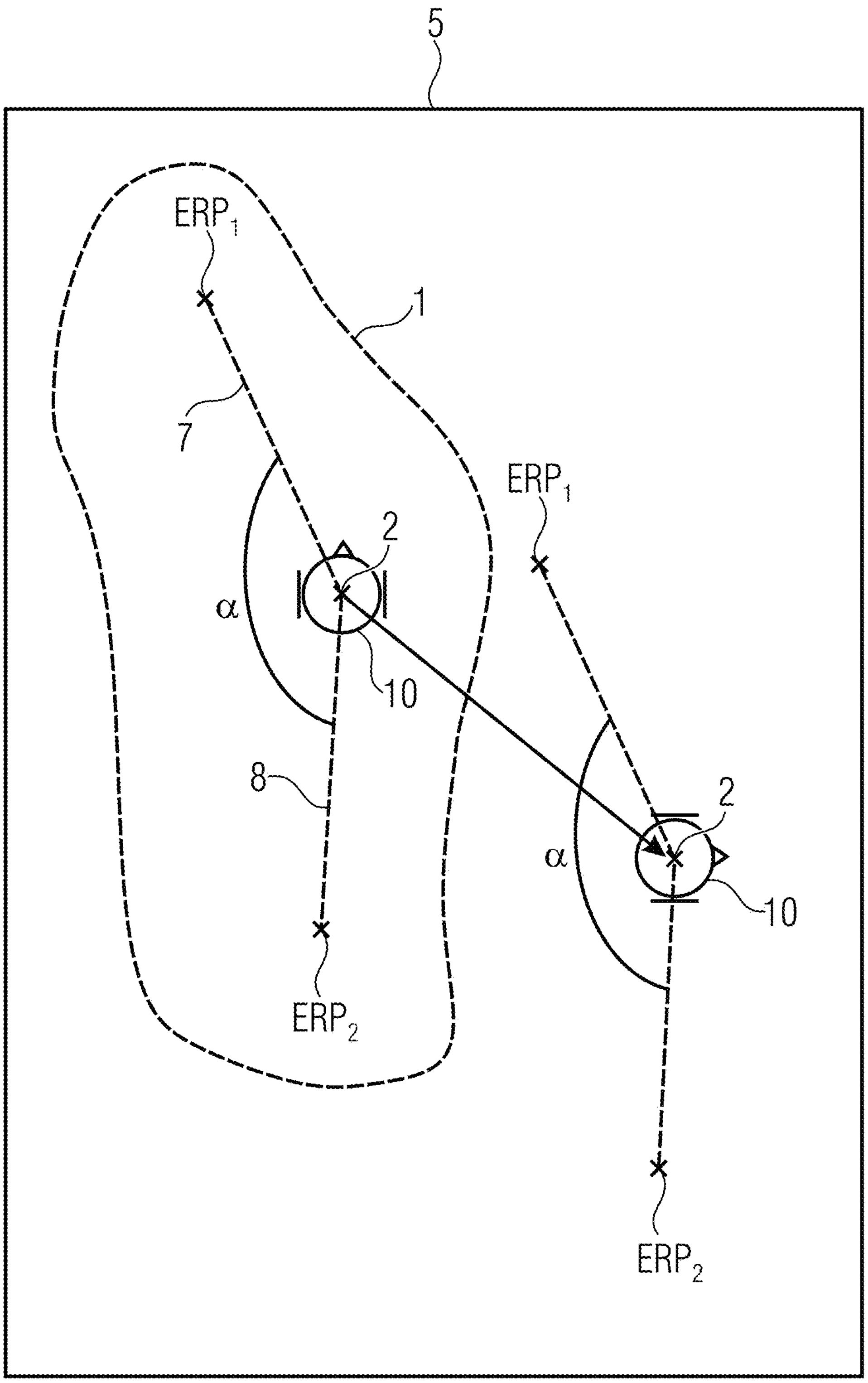
FIG. 1 shows an embodiment of an early reflection pattern.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

In the following, various examples are described which may assist in achieving a reduced audio rendering complexity when using early reflection processing concepts. The herein discussed simplified early reflection processing concepts may be added to other early reflection processing concepts heuristically designed, for instance, or may be provided exclusively.

In order to ease the understanding of the following embodiments of the present application, the description starts with a general presentation of an early reflection pattern 1, according to an embodiment of the invention. The features described with regard to the early reflection pattern 1 in FIG. 1 can also apply to any other herein described early reflection pattern 1.

An early reflection pattern 1 is indicative of a constellation of early reflection positions ERP, see $ERP_1$ and $ERP_2$. For example, the constellation shall denote a set of positions ERP along with defining their mutual placement, e.g., in terms of the angles $\alpha$ between the lines connecting the positions with the center 2 of the pattern 1. A synonymous term for constellation shall be "pattern".

The early reflection positions ERP, i.e. positions of early reflections, may indicate or identify positions in an environment 5, e.g., an indoor room or an outdoor area, at which early reflections of an audio signal may occur. For example, a listener positioned at the center 2 of the early reflection pattern 1 may perceive early reflections coming from the early reflection positions ERP. In other word, the early reflection positions ERP may indicate positions from which a listener positioned at the center of the early reflection pattern 1 receives early reflections.

The early reflection pattern 1, for example, is positioned at a listener position 10 in a manner so that the early reflection positions ERP are located around the listener position 10 and at angular directions from the listener position 10 which are invariant with respect to changes in a listener head orientation, i.e. the constellation is translatorily placed at the listener position 10. For example, the early reflection positions ERP may be determined, so that same are in a substantially uniform manner angularly distributed around the listener position 10.

According to an embodiment, the early reflection pattern 1, i.e. the early reflection positions ERP, may be determined, so that connection lines, see 7 and 8 in FIG. 1, between the respective early reflection position $ERP_1$/$ERP_2$ and the listener position 10 do mutually not overlap, i.e. are mutually distinct. This allows an even distribution and prevents accumulation of early reflection positions in the environment 5.

As shown in FIG. 1, the center 2 of the early reflection pattern 1 may be positioned at the listener position 10. The center 2 of the early reflection pattern 1 may be linked to the listener position 10 and the early reflection pattern 1 may move translational together with the listener. However, a rotational movement of the listener will not change the early reflection positions ERP, i.e. the early reflection pattern 1 will not follow a rotational motion of the listener.

According to an embodiment, the early reflection positions ERP lie in a horizontal plane along with the listener position 10.

According to an embodiment, An apparatus for audio rendering or for generating an early reflection pattern 1 may be configured to determine the early reflection positions ERP with adjusting an azimuthal rotation of the constellation according to a pattern azimuth parameter in a bitstream comprising a representation of an audio signal to be rendered. In other words, the complete early reflection pattern 1 may be rotated to better approximate real early reflections, e.g. in a certain environment 5. This azimuthal rotation is not performed in reaction to movements, e.g., a rotational movement of the listener. This adjustment of the azimuthal rotation of the constellation may be performed at an initial determination of the early reflection pattern 1. Once the early reflection pattern 1 is determined, all early reflection positions ERP can solely undergo an identical translational movement in reaction to a translational movement of the listener position 10. The arrangement of the early reflection positions ERP relative to the center 2 of the pattern 1 may be determined using the adjustment of the azimuthal rotation of the constellation. Once the pattern 1 is determined, it may not be adjusted anymore, i.e. a movement of a listener position does not change the relative arrangement between the early reflection positions ERP and the center 2 of the pattern 1.

According to an embodiment, at least one room acoustical parameter which is representative of an acoustical characteristic of an acoustic environment may be considered at a determination of the early reflection pattern. The at least one room acoustical parameter comprises one or more of room dimensions, room volume, and predelay time to the late reverberation. Advantageously, the at least one room acoustical parameter comprises only one of this acoustical characteristics of the acoustic environment. The at least one room acoustical parameter can be received or read from a bitstream, e.g., from the bitstream comprising a representation of an audio signal to be rendered using the early reflection pattern 1.

According to an embodiment, the early reflection pattern 1 can be determined in a manner so that a number of the early reflection positions depends on the at least one room acoustical parameter and/or so that a mutual spacing of the early reflection positions is varied/adapted dependent on the at least one room acoustical parameter. For example, the mutual spacing of the early reflection positions is varied by central expansion centered at the listener position.

According to an embodiment, the number of early reflection positions ERP of the pattern 1 can be determined so that

- the number and/or a farthest early reflection position from the listener position is larger the larger the room dimensions are, or
- the number and/or a farthest early reflection position from the listener position is larger the larger the room volume is, or
- the number and/or a farthest early reflection position from the listener position is larger the larger the predelay time to the late reverberation is.

Under "a farthest early reflection position from the listener position" a "distance of a maximally distanced position among the early reflection positions to the listener position" is understood. According to an embodiment, early reflection positions ERP are placed near the center 2 of the pattern 1 and the more early reflection positions ERP are comprised by the pattern 1 the farther away is the farthest early reflection position from the center 2.

According to an embodiment, mutual spacing of the early reflection positions ERP can be varied/adapted dependent on the at least one room acoustical parameter by uniformly increasing a distance of each early reflection positions ERP to the center 2 with increasing room dimensions, room volume, or predelay time to the late reverberation. Optionally, the mutual spacing of the early reflection positions ERP can be varied/adapted dependent on the at least one room acoustical parameter, so that a distance of a maximally distanced position among the early reflection positions ERP to the listener position 10 is larger the larger the room dimensions are, or the larger the room volume is, or the larger the predelay time to the late reverberation is with the distance being smaller than the predelay time. This allows an even distribution of the early reflection positions ERP and thus an acoustically convincing ER rendering result. It may be advantageous, if the distance of the maximally distanced position among the early reflection positions ERP to the listener position 10 is increased more than a distance of the nearest distanced position among the early reflection positions ERP to the listener position 10 with increasing room dimensions, room volume, or predelay time to the late reverberation.

Figure 2:
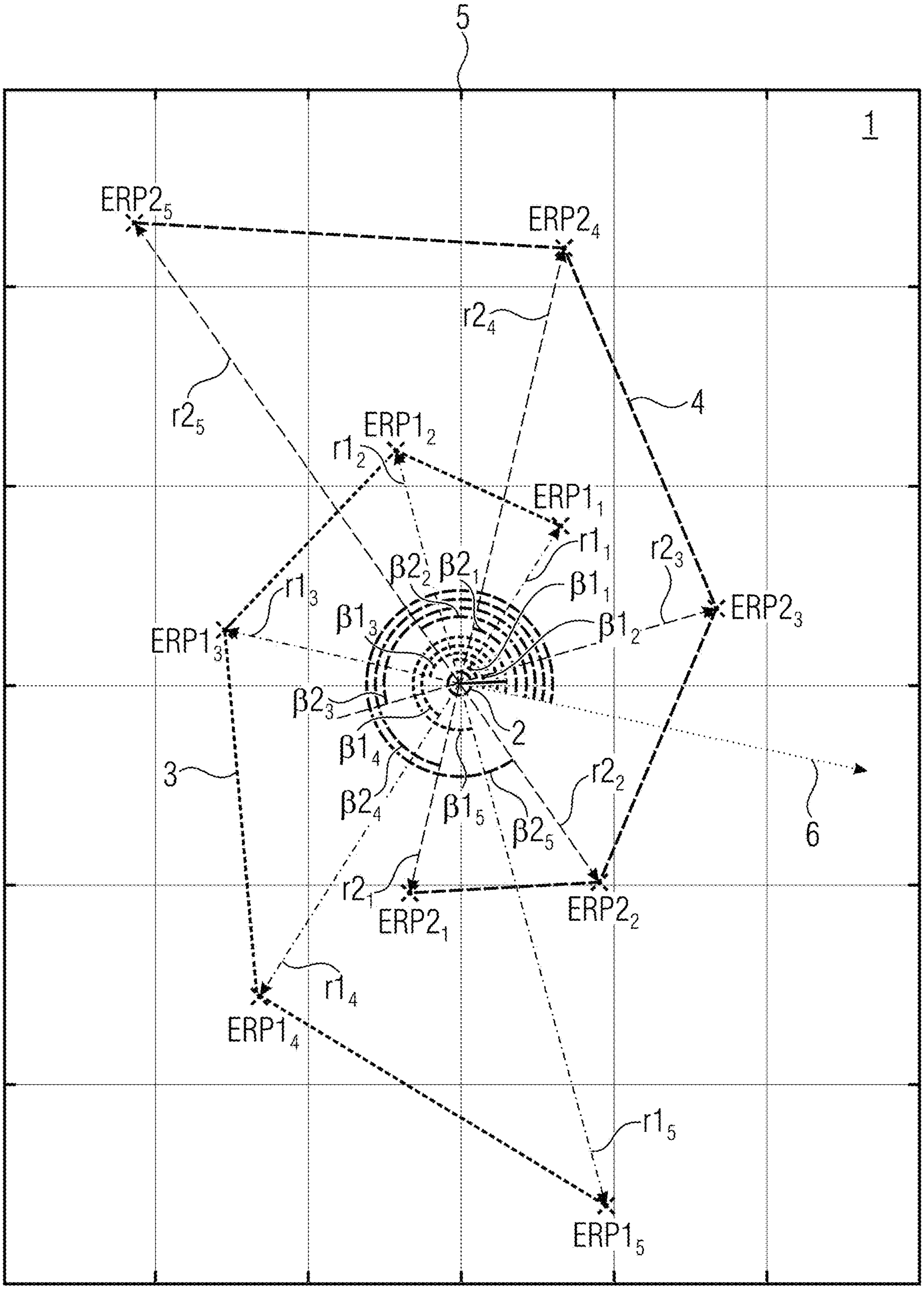
FIG. 2 shows an embodiment of an early reflection pattern determined using spiral functions.

FIG. 2 shows an embodiment of an early reflection pattern 1 usable for early reflection processing of an audio signal. The early reflection pattern 1 comprises early reflection positions ERP, see $ERP1_1$ to $ERP1_5$ (ERP1) and $ERP2_1$ to $ERP2_5$ (ERP2) in FIG. 2. FIG. 2 shows exemplarily 10 early reflection positions ERP. However, it is clear that the early reflection pattern 1 can comprise a different number of early reflection positions ERP. The early reflection pattern 1 may comprise two or more early reflection positions ERP, e.g., only the early reflection position $ERP1_1$ and $ERP2_1$.

As shown in FIG. 2, two spiral functions 3 and 4 centered at a listener position, i.e. the center 2, can define positions of the early reflections, i.e. the early reflection positions ERP, e.g., within an environment 5. However, it is clear that the positions of the early reflections can alternatively be defined by only one spiral function 3 or 4 or by more than two spiral functions. An apparatus for audio rendering or for generating an early reflection pattern 1 may be configured to place the early reflection positions ERP using the one or more spiral functions 3, 4 to determine the early reflection pattern 1 in the environment 5. For example, the respective apparatus may be configured to place a first set of early reflection positions ERP1, see $ERP1_1$ to $ERP1_5$, using the first spiral function 3 and a second set of early reflection positions ERP2, see $ERP2_1$ to $ERP2_5$, using the second spiral function 4.

Each of the first set of early reflection positions ERP1 is associated with a corresponding early reflection position of the second set of early reflection positions ERP2. For example, the early reflection position $ERP1_1$ may be associated with the corresponding early reflection position $ERP2_1$, the early reflection position ERP12 may be associated with the corresponding early reflection position ERP22, the early reflection position ERP13 may be associated with the corresponding early reflection position ERP23, the early reflection position ERP14 may be associated with the corresponding early reflection position ERP24 and the early reflection position $ERP1_5$ may be associated with the corresponding early reflection position $ERP2_5$. For each of the first set of early reflection positions ERP1, the respective early reflection position ERP1 is positioned on an opposite side of a line perpendicularly crossing a connecting line between the respective early reflection position ERP1 and the corresponding early reflection position ERP2 of the second set of early reflection positions ERP2. This ensures that the listener receives early reflections from different directions and prevents an accumulation of early reflection positions in one area. This positioning using the spiral functions enables a uniform distribution of early reflection positions in the environment 5, resulting into an acoustically convincing, but computationally moderate early reflection rendering result of an audio signal.

FIG. 2 shows an example at which, for each of the first set of early reflection positions ERP1, the corresponding early reflection position ERP2 of the second set of early reflection positions ERP2 is angularly offset relative to the connecting line into an angular direction which is common for all early reflection positions ERP1 of the first set of early reflection positions ERP1.

According to an embodiment, the apparatus for audio rendering or for generating an early reflection pattern 1 may be configured to place the early reflection positions ERP1 and ERP2 using the two spiral functions 3 and 4,

- so that each of the first set of early reflection positions ERP1 is associated with a corresponding early reflection position of the second set of early reflections ERP2, and
- so that, for each of the first set of early reflection positions ERP1, the respective early reflection position ERP1 is positioned on a side of a respective line perpendicularly crossing at the pattern center 2 an axis running through the pattern center 2 and the respective early reflection position ERP1 of the first set of early reflection positions ERP1 and so that the respective corresponding early reflection position ERP2 of the second set of early reflections ERP2 is positioned on an opposite side of the respective line, and
- so that the respective corresponding early reflection position ERP2 of the second set of early reflection positions ERP2 is angularly offset (see $\gamma$ for the corresponding early reflection positions $ERP1_1$ and $ERP2_1$) relative to the respective axis into an angular direction which is common for all early reflection positions ERP1 of the first set of early reflection positions ERP1 and/or which is common for all early reflection positions ERP2 of the second set of early reflection positions ERP2.

The one or more spiral functions 3, 4 may define the early reflection positions ERP in polar coordinates (r, $\beta$), see ($r1_{1\ to\ 5}$, $\beta_{1\ to\ 5}$) for defining the early reflection position ERP1 of the first set of early reflection positions ERP1 and ($r2_{1\ to\ 5}$, $\beta_{1\ to\ 5}$) for defining the early reflection position ERP2 of the second set of early reflection positions ERP2.

As will be described in the following in more detail, see especially section 1 "Indoor ER Parameter Calculation", the one or more spiral functions 3, 4 can be parameterized depending on at least one room acoustical parameter, i.e. the respective spiral function 3, 4 defines the respective early reflection positions ERP dependent on the at least one room acoustical parameter. The at least one room acoustical parameter comprises one or more of room dimensions, room volume and predelay time to late reverberation. The at least one room acoustical parameter may be representative of an acoustical characteristic of an acoustic environment 5.

For example, the one or more spiral functions 3, 4 can be parameterized depending on the at least one room acoustical parameter,

- so that a number of the early reflection positions ERP is larger the larger the room dimensions are, or larger the larger the room volume is, or larger the larger the predelay time to the late reverberation is; and/or
- so that, for each of the early reflection positions ERP, a distance of the respective early reflection position ERP to the center 2 of the early reflection pattern 1 is larger the larger the room dimensions are, or larger the larger the room volume is, or larger the larger the predelay time to the late reverberation is.

According to an embodiment, the apparatus for audio rendering or for generating an early reflection pattern 1 may be configured to parametrize the one or more spiral functions and determine a number of early reflection positions ERP so that a distance of a maximally distanced position among the early reflection positions to the listener position is larger the larger the room dimensions are, or the larger the room volume is, or the larger the predelay time to the late reverberation is with the distance being smaller than the predelay time.

According to an embodiment, the apparatus for audio rendering or for generating an early reflection pattern 1 may be configured to support different determinations of the early reflection pattern. The apparatus for audio rendering or for generating an early reflection pattern 1 may be configured to choose the type of determination dependent on the environment 5. For example, the determination, e.g., a first determination, of the early reflection pattern 1 using one or more spiral functions 3, 4 and/or the determination, e.g., a first determination, of the early reflection pattern 1 in a manner so that the number of the early reflection positions depends on the at least one room acoustical parameter may be associated with an indoor environment, like a room, see especially section 1 "Indoor ER Parameter Calculation". Such a determination, e.g., a first determination, may be selected in case of the acoustic environment 5 being an indoor environment or in case of a pattern type index in a bitstream comprising a representation of an audio signal to be rendered assuming a predetermined state. An alternative determination, e.g., a second determination, is described in more detail in section 3 "Outdoor ER Pattern".

Figure 3A:
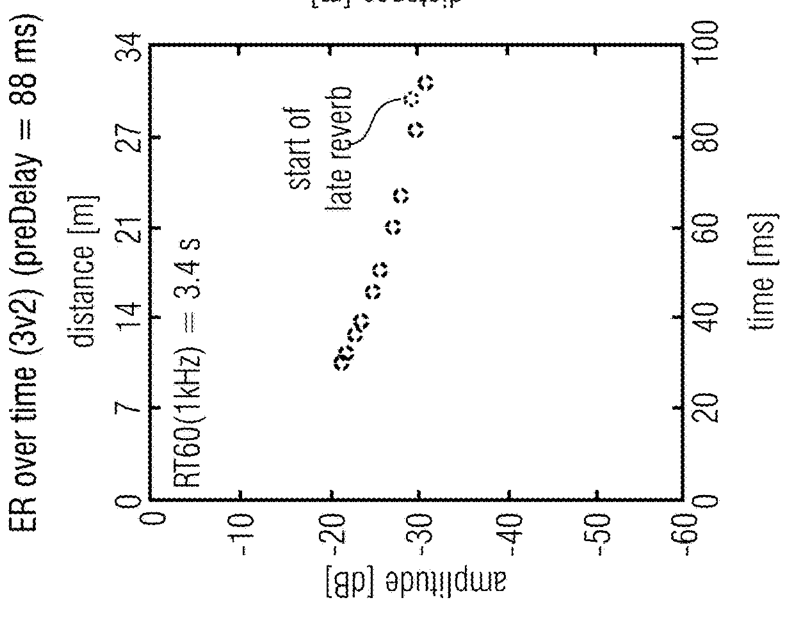
FIG. 3A-3C show embodiments of an early reflection pattern over A) time, B) spatial top view and C) frequency dependency.
Figure 3B:
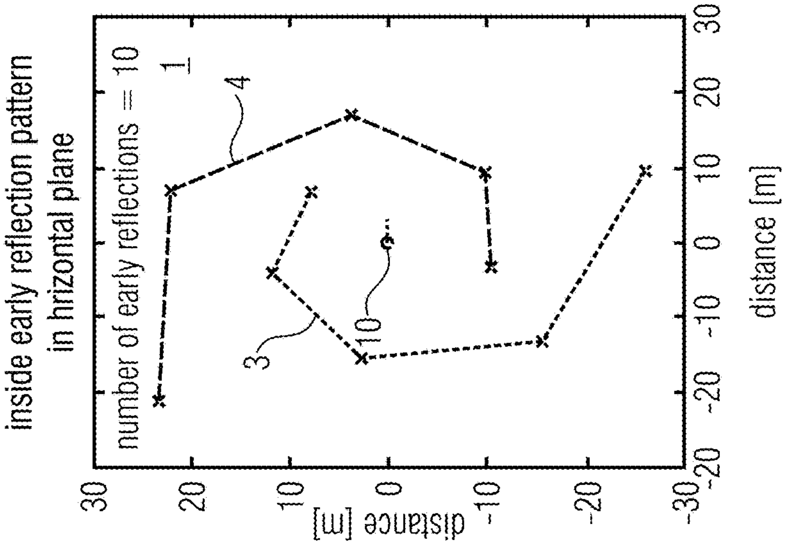
Figure 3C:
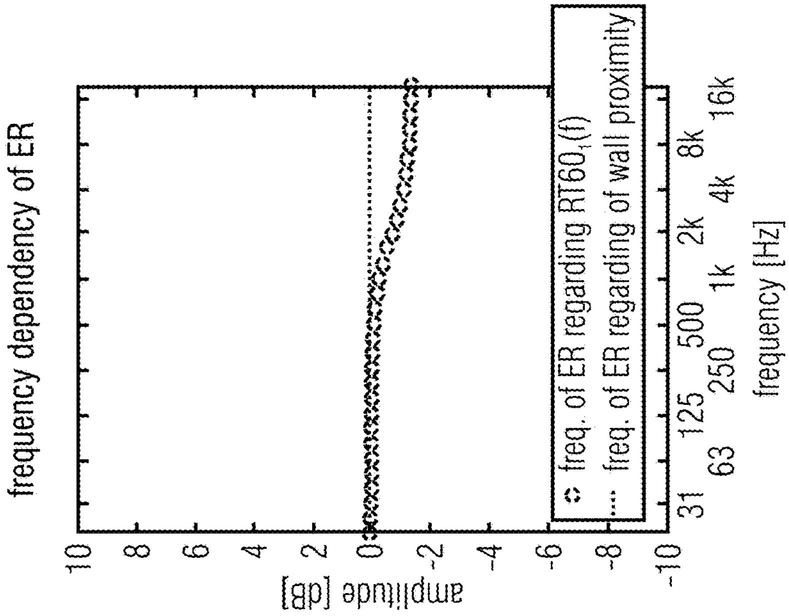

As already described above, one of the newly invented ER patterns 1 for indoor consists of two spirals, see FIG. 3B. This pattern 1 has the advantage to cover all directions around the listener 10 while providing an even distribution over time without clustering. The number of early reflections (ERs) can be adapted to the size of the room, which can also be derived from the predelay for the late reverb. The frequency dependency of RT60 may also define the frequency dependency of the ERs. RT60, or the average absorption factor, defines an additional amplification on top of the normal distance influence. From the frequency dependency of RT60, a simple shelving filter is calculated to adapt the frequency response of the early reflections to the overall absorption behavior, described by RT60. FIG. 3A-3C show the new ER pattern 1 over time (see FIG. 3A), spatial top view (see FIG. 3B), frequency dependency (see FIG. 3C).

1 Indoor ER Parameter Calculation

The following description of the indoor ER parameter calculation refers to FIG. 2 and FIG. 3A-3C.

The variable parameters for the spiral pattern, i.e. for the first spiral function 3 and for the second spiral function 4, are mainly set by the predelay time. For example, used is the predelay time to the late reverb, e.g.

$$predelay \approx 1000 \cdot \frac{\max(roomdim)}{c}[\text{ms}],\ c = 343\frac{\text{m}}{\text{s}}$$

The parameters are set dependent on the predelay of the room, which defines the start of the late reverb and calculated with Eq. 1.

$$NumER/2 = \text{floor}\left(3 * \frac{\ln(predelay)}{2}\right) \quad \text{Eq. 1}$$

$$ampFac = [1 \ldots 4], \text{ often 2 or 3}$$

$$distFac = [1 \ldots 4], \text{ often 2 or 3}$$

$$initDelay = [10 \ldots 50], \text{ often 15 or 30}$$

$$alpha = [0 \ldots 1], \text{ often 0.1 or 0.3}$$

NumER represents the number of early reflection positions.

The first spiral function 3 and the second spiral function 4 can be used so that the first set of early reflection positions ERP1 is determined in polar coordinates as (r1; β1) and the second set of early reflection positions ERP2 is determined in polar coordinates as (r2; β2). Azimuth and radius calculation of ER positions with the two spiral pattern:

$$\beta 1 = n \cdot \frac{\pi}{3},\ n = [1{:}NumER/2] \quad \text{Eq. 2}$$

$$\beta 2 = \frac{\pi}{8} + n \cdot \frac{\pi}{3},\ n = [1{:}NumER/2] \quad \text{Eq. 3}$$

$$r1 = distfactor * \text{base}^{2*\beta 1/\pi},\ \text{base} = 1.85 \quad \text{Eq. 4}$$

$$r2 = -distfactor * \text{base}^{2*\beta 1/\pi},\ \text{base} = 1.85 \quad \text{Eq. 5}$$

$$amp1 = (1 - \text{alpha})/r1 \quad (1)$$

$$amp2 = (1 - \text{alpha} - 0.01) * \text{abs}(1/r2) \quad (2)$$

The constant distfactor may correspond to the above mentioned constant distFac. According to an embodiment, the distfactor can be determined based on the at least on room acoustical parameter, e.g., the distfactor can be determined such that same is the larger the larger the predelay time to the late reverb is.

As can be seen in FIG. 2. a polar axis 6 runs through the center 2 of the early reflection pattern 1. The origin, i.e. the center 2, of the early reflection pattern 1 represents a pole. A ray runs from the pole in a reference direction, i.e. representing the polar axis 6, so that the azimuth $\beta_{(1\ to\ 5)}$ defining the angular coordinate of the early reflection positions $ERB1_{(1\ to\ 5)}$ of the first set of early reflection positions ERB1 and the azimuth $\beta 2_{(1\ to\ 5)}$ defining the angular coordinate of the early reflection positions $ERB2_{(1\ to\ 5)}$ of the second set of early reflection positions ERB2 represent angles from the polar axis 6. The radius coordinates of the early reflection positions ERP1 are directed into the reference direction and the radius coordinates of the early reflection positions ERP are directed into a direction opposite to the reference direction, see FIG. 2 and Eq. 4 and Eq. 5.

An apparatus for sound rendering can be configured to generate early reflection contribution loudspeaker signals relating to an early reflection portion of a room impulse response by performing a rendition of an audio signal of one or more sound sources from the early reflection positions ERP, e.g., in a manner level adjusted according to a distance of the respective early reflection position to the listener position, e.g., see the determination of amp1 and amp2 above. For example, for each of the first set of early reflection positions ERB1, the audio signal of the sound source is rendered from the respective early reflection position ERB1 at the level amp1 and, for each of the second set of early reflection positions ERB2, the audio signal of the sound source is rendered from the respective early reflection position ERB2 at the level amp2.

The amplitude of the reflections is dependent on several influencing parameters:

a) Standard distance law (factor 2 reduction per distance doubling)

b) Correction by $$ampCorrection = ampFac \cdot (1 - \text{absorption})/slDistance \quad \text{Eq. 6}$$

with slDistance representing a source listener distance. The terms ampFac and absorption represent constants.

Figure 4:
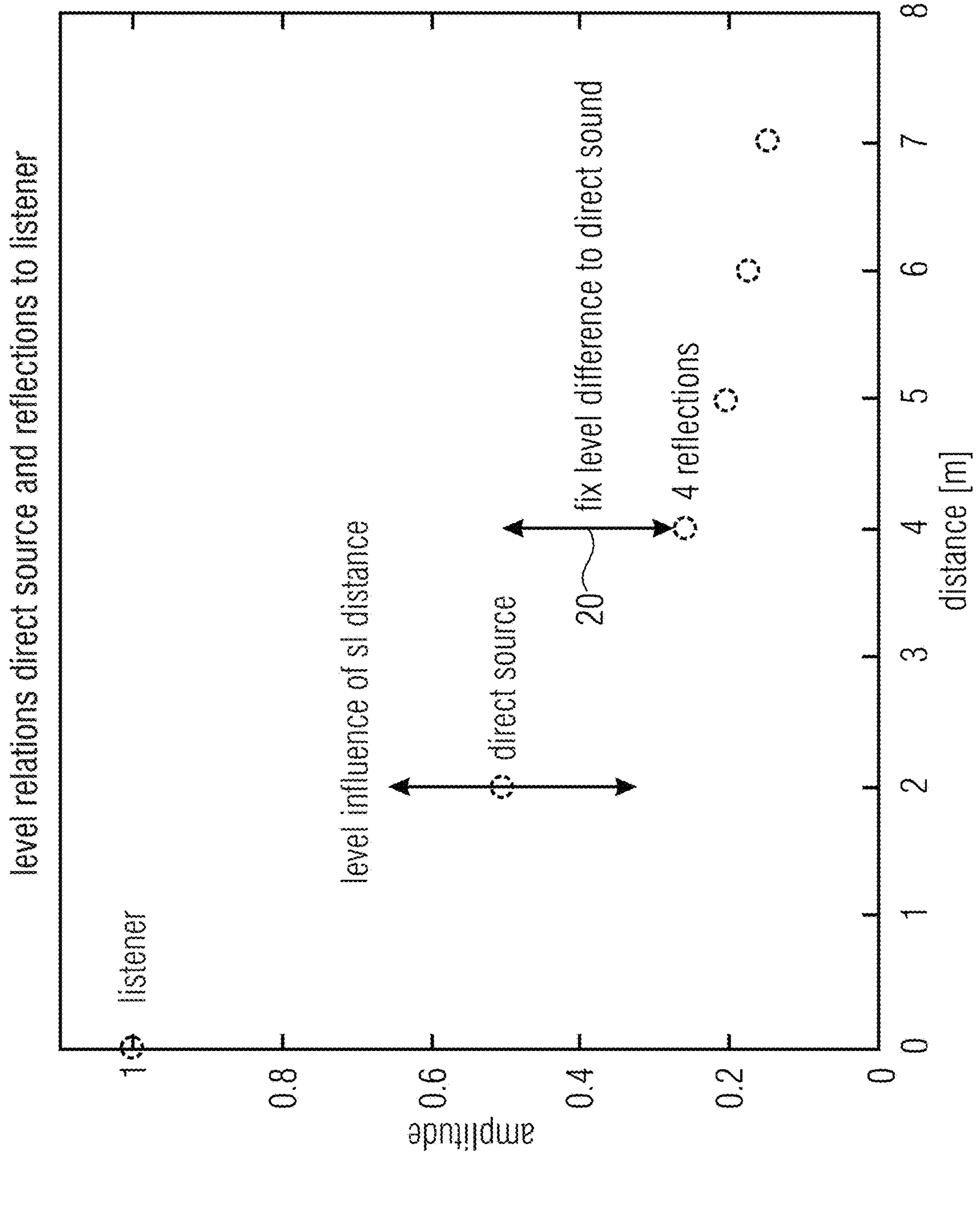
FIG. 4 shows a level relation between listener, direct source and reflections.

As seen in FIG. 4 is the level relation between the reflections and the direct source level is fix. The level of the here shown five sources (one direct source and four early reflections) go up and down in relation to the source-listener distance (sl distance). FIG. 4 shows a level relation between listener, direct source and reflections.

The rendering of the audio signal of the sound source from each early reflection position in a manner level adjusted according to a distance of the respective early reflection position to the listener position, may be performed by offsetting 20 a level at which the audio signal of the sound source is rendered from the respective early reflection position, using a level offset, or amplify same with a level factor, which offset or factor is common for all early reflection positions, and setting the level offset or level factor according to an amplitude correction factor (see Eq. 6).

For example, for each of the first set of early reflection positions ERB1, the level amp1 at which the audio signal of the sound source is rendered from the respective early reflection position ERB1 is offset by ampCorrection (see Eq. 6) and, for each of the second set of early reflection positions ERB2, the level amp2 at which the audio signal of the sound source is rendered from the respective early reflection position ERB2 is offset by ampCorrection (see Eq. 6). The amplitude correction factor, i.e. ampCorrection of Eq. 6, may be contained in a bitstream comprising a representation of the audio signal. According to an embodiment, the amplitude correction factor is contained in one or more early reflection pattern parameters.

According to an embodiment, the rendering of the audio signal of the sound source from each early reflection position in a manner level adjusted according to a distance of the respective early reflection position to the listener position, may be performed by modifying the level adjustment according to the distance of the respective early reflection position to the listener position relative to a level adjustment used by the apparatus for rendering of the audio signal from the sound source positon according to a distance attenuation (amp1 and amp2). The distance attenuation may be contained in a bitstream comprising a representation of the audio signal. According to an embodiment, the attenuation is contained in one or more early reflection pattern parameters.

As can be seen in FIG. 4, at the rendering the level at which the audio signal of the sound source is rendered from the respective early reflection position is offset 20, wherein the same offset applies for all early reflection positions ERP of the early reflection pattern 1. Additionally, at the rendering the level at which the audio signal of the sound source is rendered from the respective early reflection position may be attenuated dependent on a distance between the respective early reflection position and the listener, e.g., using a corrected distance law.

As described above for an audio signal of a single sound source, it is also possible to apply this rendering technic to two or more audio signals of two or more sound sources, wherein the special rendering is applied to a weighted sum of the two or more audio signals. The calculation of the weighted sum is described in more detail in section 5.

2 Implementation in a VR System

Figure 5:
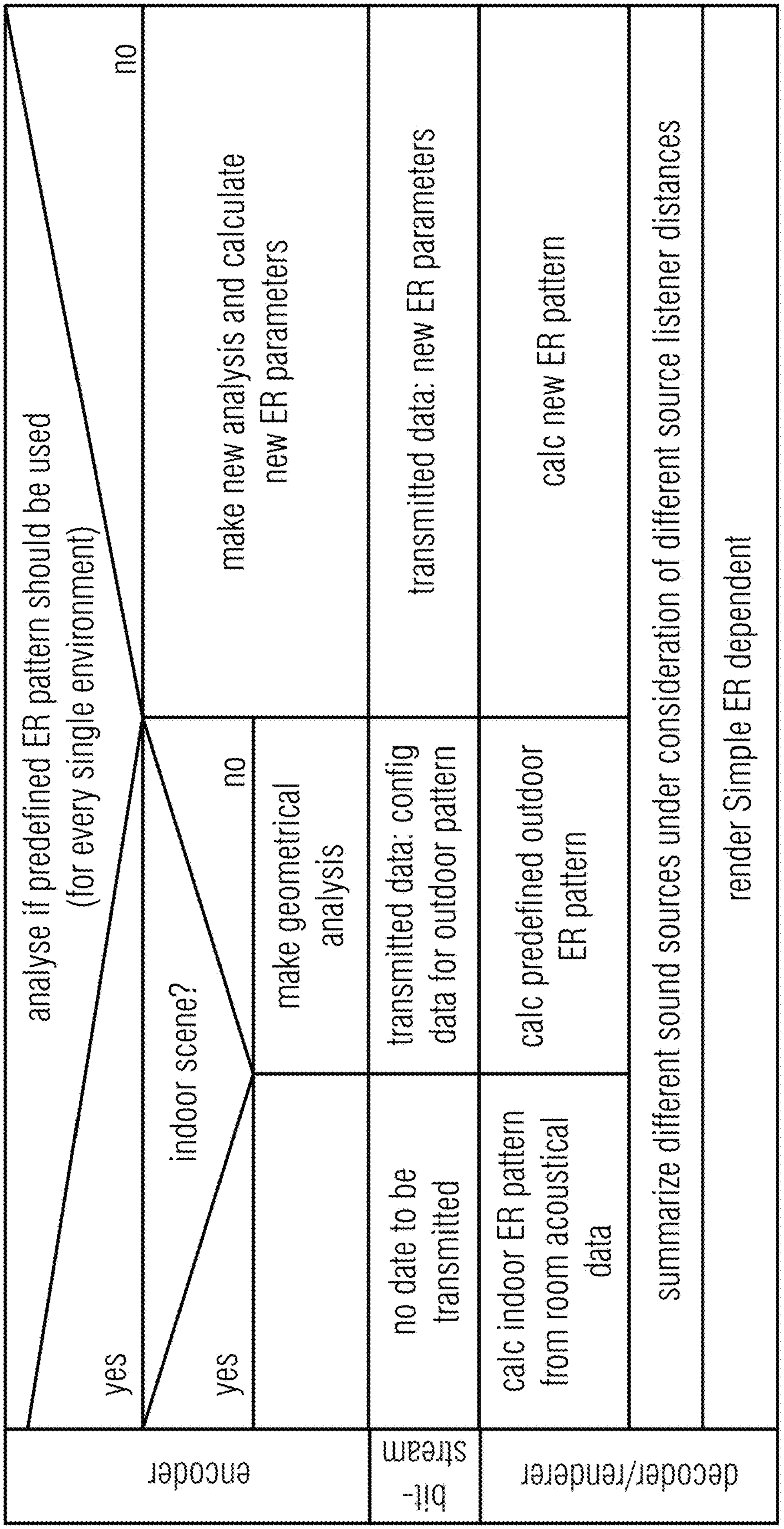
FIG. 5 shows an implementation of simple ER algorithm in encoder/decoder/renderer.

FIG. 5 presents a structogram diagram of the Simple ER software algorithm in an encoder/decoder environment. FIG. 5 shows an implementation of simple ER algorithm in en- and decoder/renderer. First, it is decided if a predefined ER pattern is used or not. The next decision is for an in- or outdoor ER pattern. For an indoor pattern no further parameters have to be transmitted. The ER pattern is calculated from the acoustical scene parameters already existing. For an outdoor pattern the geometry of the scene is analyzed, these parameters are transmitted and the ER outdoor pattern is calculated in the decoder. For more details see Section 3. For the transition from one acoustical environment to the next, see Section 4. For the handling of several audio sources in one scene see Section 5.

3 Outdoor ER Pattern

Figure 6:
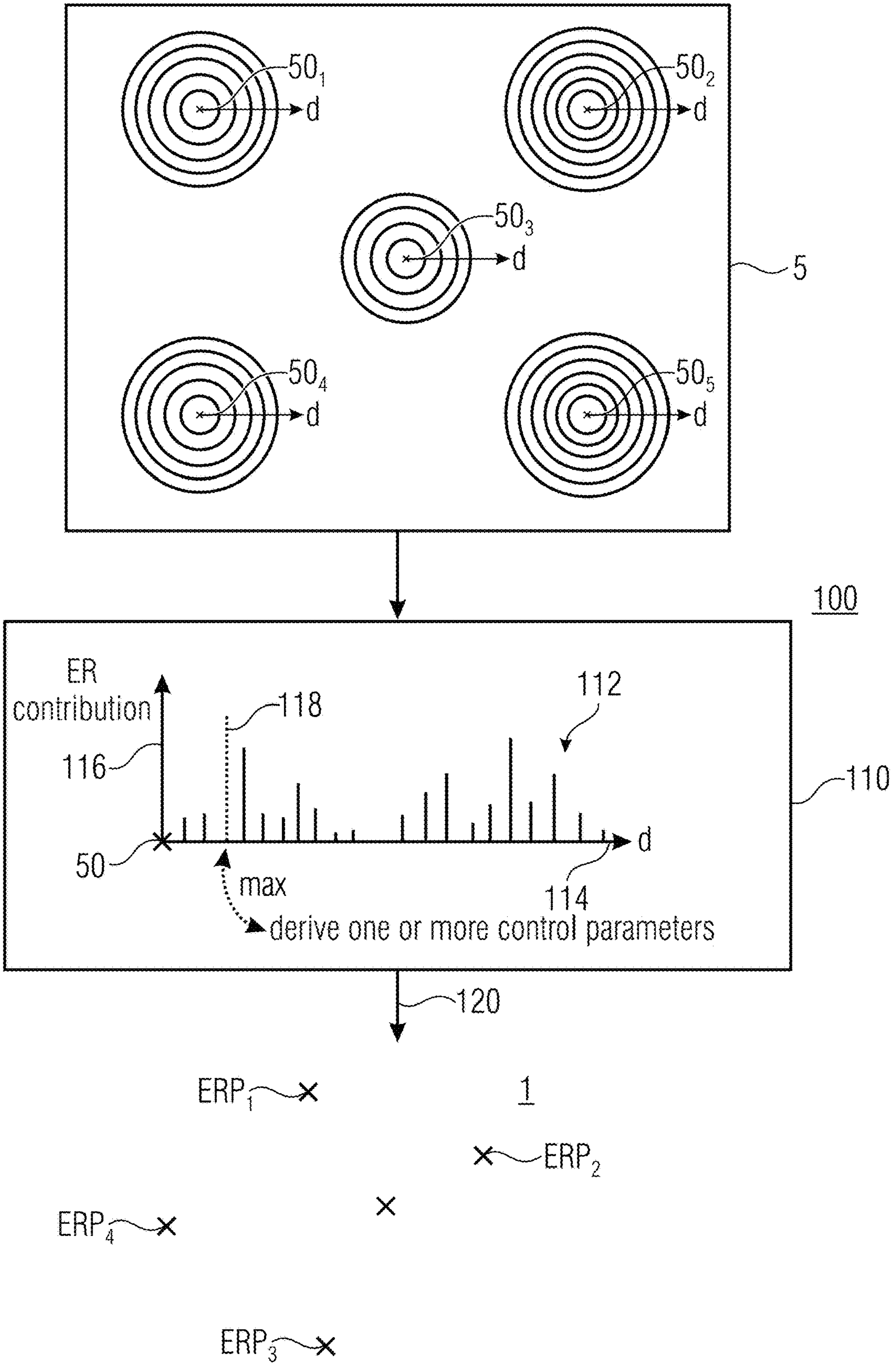
FIG. 6 shows an apparatus for determining an early reflection pattern by analyzing an environment.

An embodiment shown in FIG. 6 relates to an apparatus 100, for determining an early reflection pattern 1 for sound rendition, configured to perform a geometric analysis 110 of an acoustic environment 5 by, at each of one or more analysis positions 50, see $\mathbf{50}_1$ to $\mathbf{50}_5$, determining a function 112 indicative, for each of different distances 114 from the respective analysis position 50, a value representative of an early reflection contribution 116. The function 112 or a further function derived therefrom is analyzed with respect to one or more maxima 118 to derive one or more control parameters 120. Additionally, the apparatus 100 is configured to determine an early reflection pattern 1, which is indicative of a constellation of early reflection positions ERP, see $ERP_1$ to $ERP_4$, by placing the early reflection positions using the one or more control parameters. The features of the apparatus 100 are described in the following in more detail.

Figure 7:
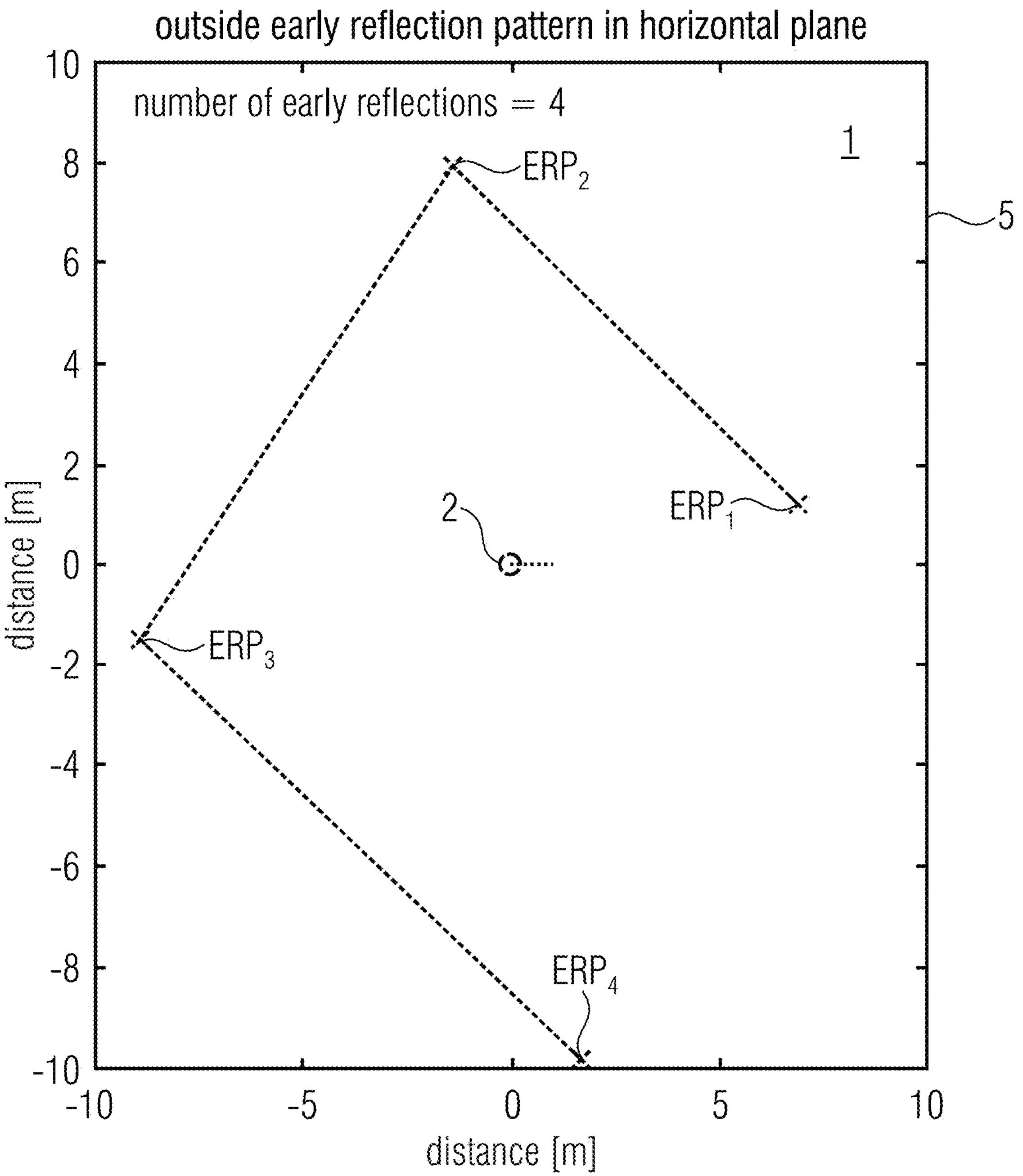
FIG. 7 shows a spatial top view of an embodiment of an ER pattern with four early reflection positions.

Specifically for outdoor scenes, but not limited thereto, a new pattern 1 with four roughly cross-positioned ERs is designed, see FIG. 7. FIG. 7 shows a spatial top view of a new ER pattern 1 with four early reflection positions $ERP_1$ to $ERP_4$. The different distances, i.e. the respective distance between the respective early reflection position and the center 2, may be defined here by a predelay time and a compression factor, which are derived from geometry analysis 110 of the scene, i.e. the environment 5.

Figure 8A:
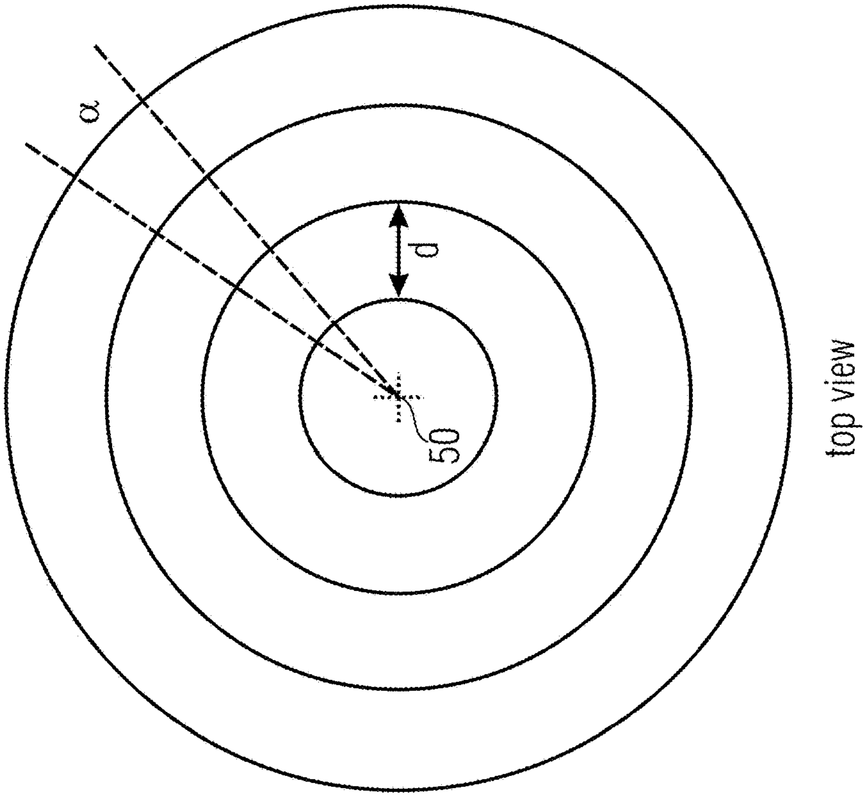
FIG. 8A-8B show a geometrical outdoor scene analysis.
Figure 8B:
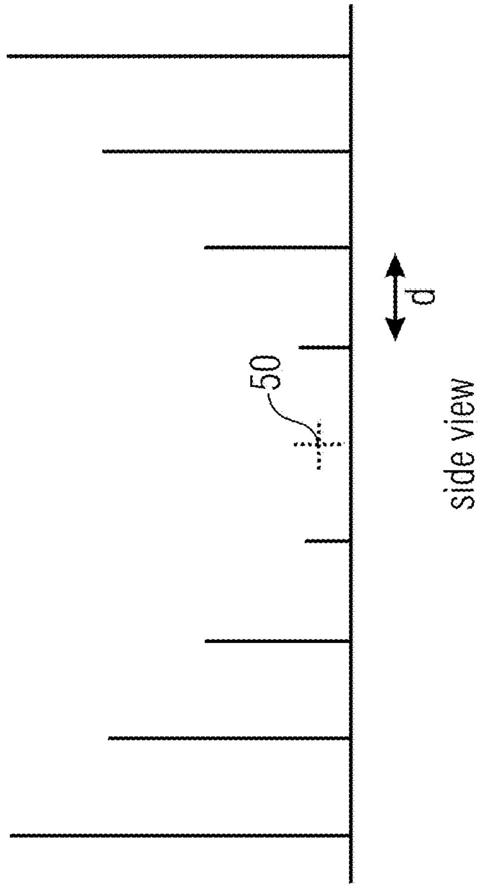

Usage of ER patterns for outdoor environments known is highly individual and dependent on the physical setup of the scene. The geometrical analysis 110 described hereafter captures perceptually important characteristics of the outdoor scene, i.e. the environment 5, which are relevant to the perception of ERS:

FIGS. 8A and 8B show a geometrical outdoor scene analysis. FIG. 8A shows a top view of rings around an analysis point. FIG. 8B shows a side view around an analysis point with rings of increasing height. From a central listening point, e.g., an analysis point 50, concentric rings are positioned. The area of the rings, defined by radius and height, represents the maximum possible reflection energy at this distance, see FIGS. 8A and 8B. There is a spacing d between the rings (e.g. 3 m). Rays with an angular spacing a (e.g.) 6° are sent out from the analysis point 50. The first surfaces that hit are counted to the existing reflection surface at this distance and summed up over the ring. With this approach it is possible to determine the function 112 indicative of, for each of the different distances from the respective analysis position 50, a value representative of an early reflection contribution. This function may be determined for each of the analysis points 50.

In other words, the acoustic environment 5 is radially sampled with respect to a nearest reflective surface distance to obtain a radial sampling result. Additionally, a radial integration over the radial sampling result and a weighting of the radial sampling result may be performed so as to obtain the function 112. The weighting may be performed according to radial distance so as to decrease the early reflection contribution with increasing distance.

Figure 9A:
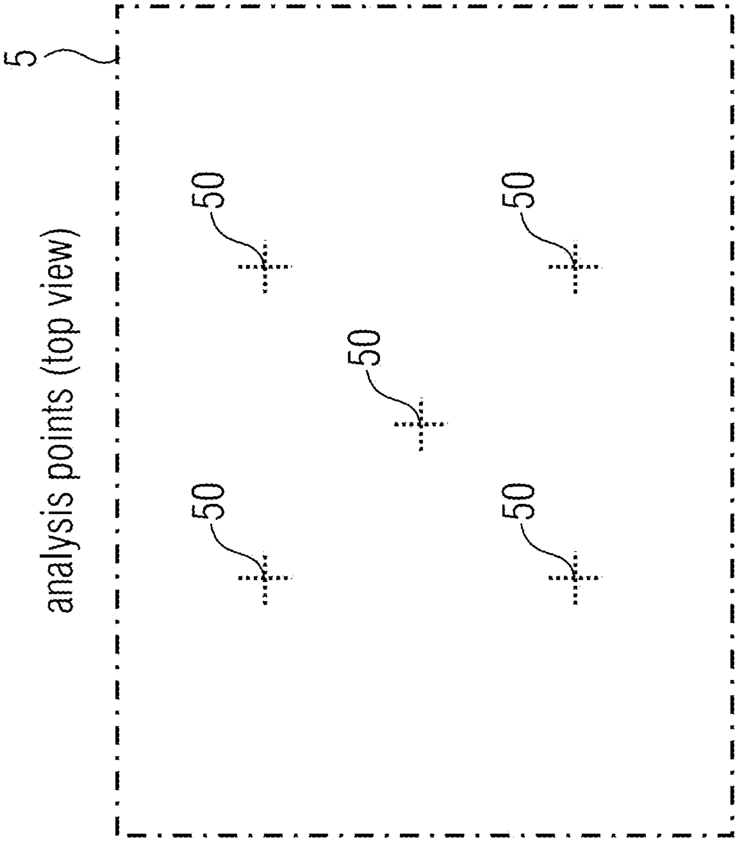
FIG. 9A-9B show a mesh of analysis points.
Figure 9B:
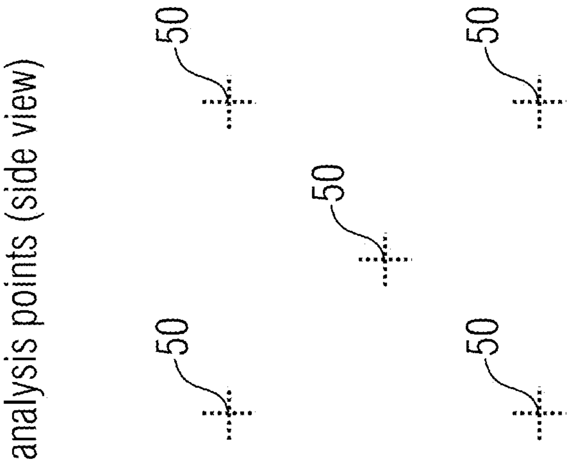

FIGS. 9A and 9B show a mesh of analysis points 50 in top (see FIG. 9A) and side (see FIG. 9B) view. The dot-dashed line indicates the user reachable area of a scene, i.e. the environment 5. There are a number of analysis points (e.g. 9) positioned in the inner part of a user reachable area, see FIGS. 9A and 9B. It is a 3D mesh, because some of the points are inside the geometrical mesh of the scene and have to be deselected.

Figure 10:
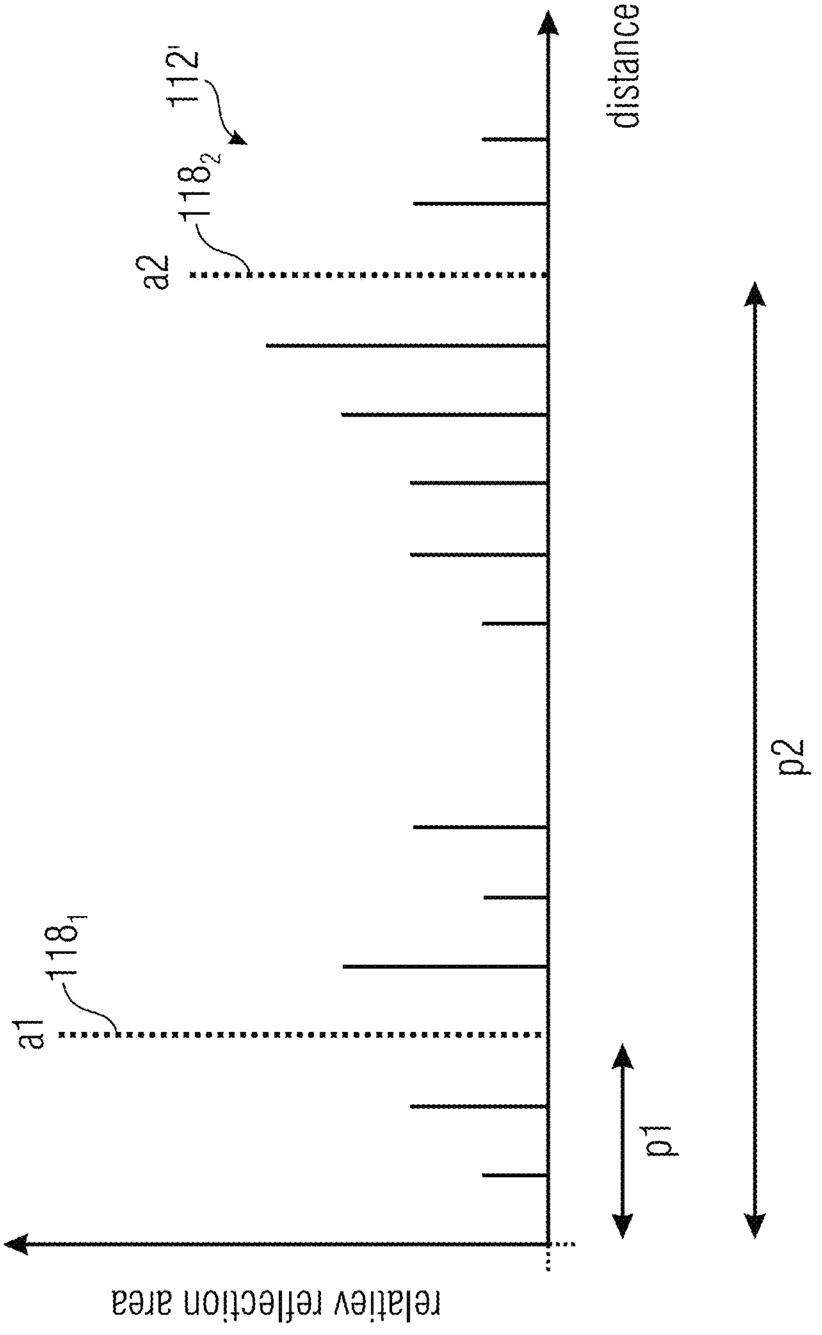
FIG. 10 shows a distribution of reflection surface area over distance, averaged over several analysis points.

Alternatively, to analyzing for each analysis point the respective function 112, it is advantageous in terms of efficiency to subject the function 112 determined at the one or more analysis positions to a summation, e.g. averaging, to yield the further function 112' shown in FIG. 10. The data over all mesh points may be averaged and the distribution can be analyzed. It represents the reflective outdoor energy over space and distance, see FIG. 10. FIG. 10 shows a distribution of reflection surface area over distance, averaged over several analysis points 50.

As can be seen in FIG. 10, the further function 112' derived from the functions associated with the individual analysis points is inspected with respect to two largest maxima to derive as the one or more control parameters 120 a first amplitude a1 and a first distance p1 for a nearest of the two largest maxima 1181, and a second amplitude a2 and a second distance p2 for a farthest of the two largest maxima 1182. Alternatively, it is possible to derive from each of the functions associated with the individual analysis points the one or control parameters 120.

The amplitudes a1 and a2-together with their distances p1 and p2—are, for example, the input values to calculate the outdoor ER pattern 1. The outdoor ER pattern 1 comprises four ERs, see FIG. 11A.

Figure 11A:
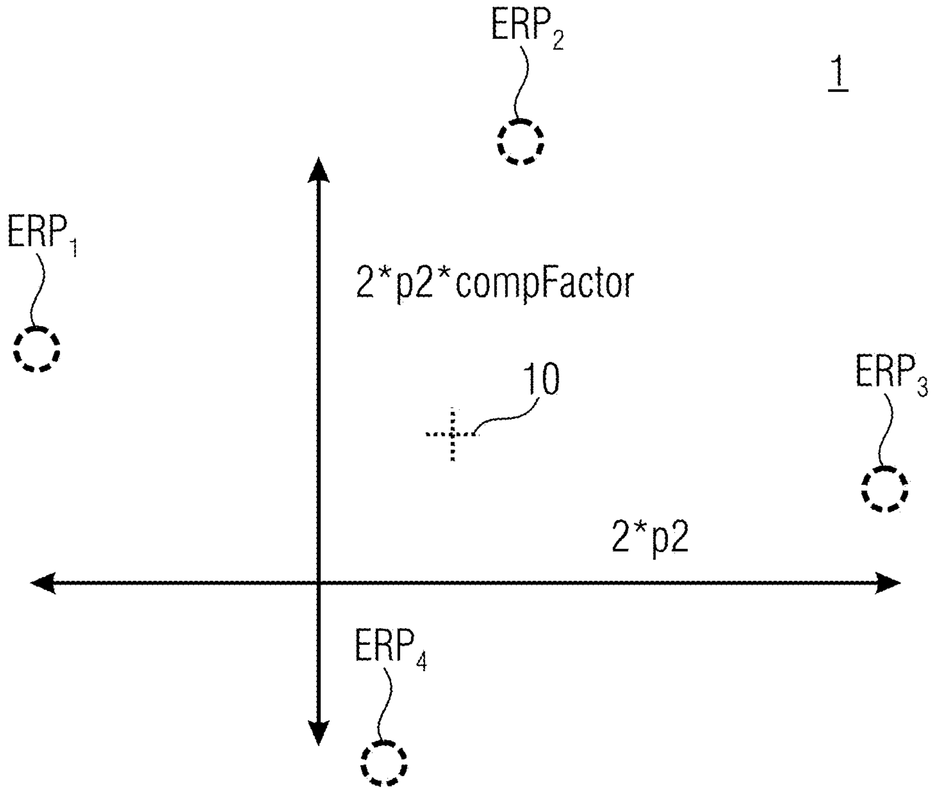
FIG. 11A shows a first embodiment of an outdoor ER pattern.

According to an embodiment shown in FIG. 11A, the ER pattern 1 is determined by setting distances of the first $ERP_1$ and the third $ERP_3$ early reflection positions from the listener position 10 depending on p2, and setting a ratio, see compFactor, between the distances of the first $ERP_1$ and the third $ERP_3$ early reflection positions from the listener position 10 on the one hand and distances of the second $ERP_2$ and fourth $ERP_4$ early reflection positions from the listener position 10 on the other hand based on a quotient or difference between a first term depending on a1 and a second term depending on a2.

FIG. 11A shows an outdoor ER pattern 1 of four reflections, see the circles (blue) around the listener, see the cross (red). The distance p2 to the second distribution maximum 1182 defines the distance to the two more distant reflections, see the early reflection positions $ERP_1$ and $ERP_3$. A compression factor compFactor may define the distance between the two more close reflections, see the early reflection positions $ERP_2$ and $ERP_4$. The relation between the amplitudes can define the compression factor, e.g.

$$comFactor = \frac{\log 10(a1)}{\log 10(a2)} - 0.05$$

The four early reflection positions $ERP_i$ can be placed so that same are positioned at polar coordinates (r (i); β(i)) with i=1 . . . 4.

The angle coordinates may be β(1)=5°-15°, β(2)~90°-110°, β(3)=180°-200°, β(4)=270°-290°. According to an embodiment, β≈[10°, 100°, 190°, 280°].

The radius coordinates may be determined according to equations 7 and 8, wherein a deviation of up to 40% from the calculated radius value may be allowable:

$$preDelay = p2/c \tag{3}$$

$$r(i) = (0.7 + (i-1)\cdot rstep)\cdot slDistance^{distAlpha} + 0.001\cdot preDelay\cdot c \quad \text{Eq. 6}$$

with i=[1 . . . 4], slDistance [m] represents a source listener distance, preDelay [ms] the time to the second distribution peak (a2), c=343 m/s represents speed of sound $$r(i) = compFac\cdot r(i) \text{ with } i = [2, 4] \quad \text{Eq. 7}$$

As can be seen, the radius coordinate of the early reflection positions $ERP_1$ and $ERP_3$ is determined with equation 7 and for early reflection positions $ERP_2$ and $ERP_4$ equation 7 is modified to become equation 8.

Figure 11B:
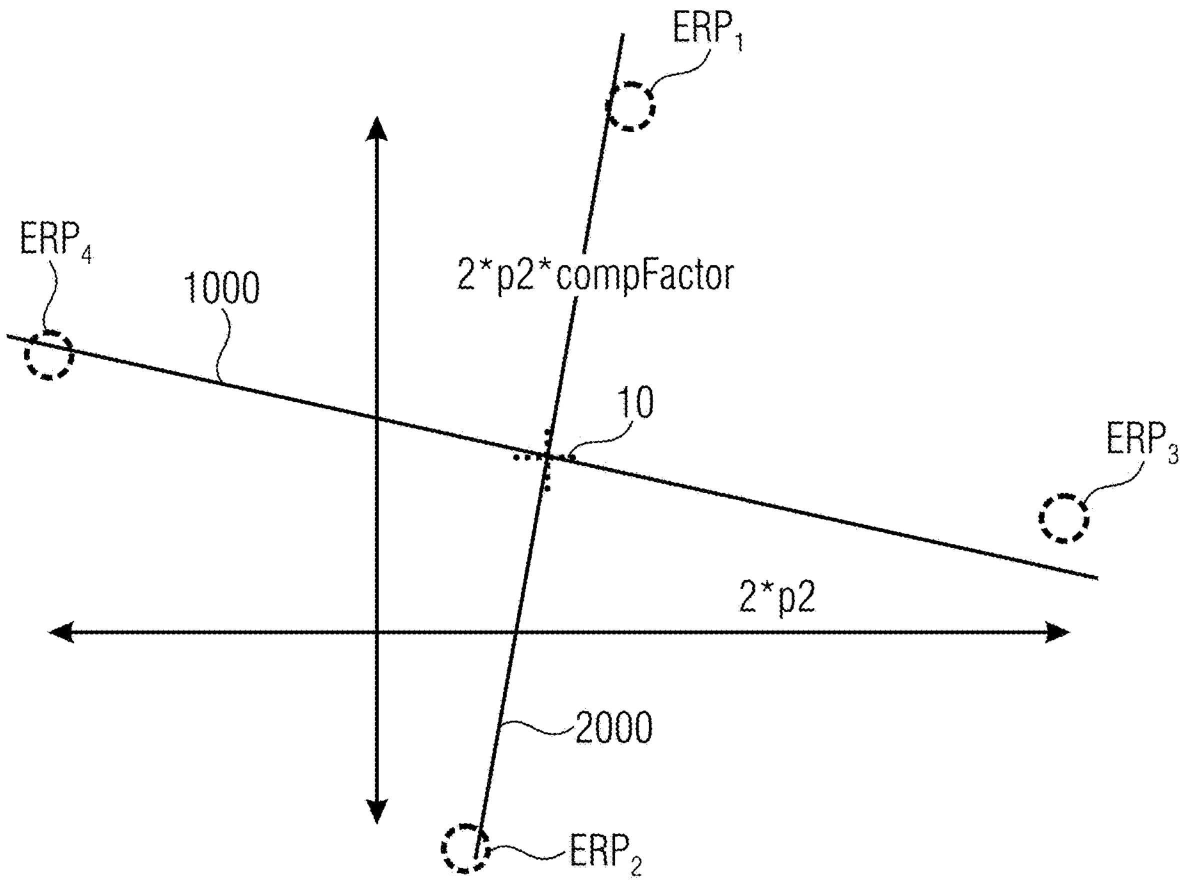
FIG. 11B shows a second embodiment of an outdoor ER pattern.

According to the embodiment shown in FIG. 11B, the four early reflection positions $ERP_1$ to $ERP_4$ may be place so that first $ERP_1$ and second $ERP_2$ early reflection positions are arranged at opposite sides of a first line 1000 crossing the listener position 10 and third $ERP_3$ and fourth $ERP_4$ early reflection positions are arranged at opposite sides of a second line 2000, perpendicular to the first line 1000 and crossing the listener position 10. According to an embodiment, the ER pattern 1 is determined by setting distances of the first $ERP_1$ and second $ERP_2$ early reflection positions from the listener position 10 depending on p2, and setting a ratio between the distances of the first $ERP_1$ and second $ERP_2$ early reflection positions from the listener position 10 on the one hand and distances of the third $ERP_3$ and fourth $ERP_4$ early reflection positions from the listener position 10 on the other hand based on a quotient or difference between a first term depending on a1 and a second term depending on a2.

The level reduction of an acoustical point source in free-field conditions follows a 1/r law, corresponding to an amplitude reduction of factor 2 for every distance doubling, [13]. When the influence of different reflective areas are summarized in few ERs, this reduction over distance should be reduced by an exponential factor.

$$ampRefl(r) = 1/r^{distAlpha}$$

The distAlpha values [0.5 . . . 1] can be estimated from the area distribution by e.g.

$$distAlpha = \left(\log 10\frac{a2}{p2} - \log 10\frac{a1}{p1}\right)/4.5$$

A deviation of about 20% from the calculated distAlpha values may be allowable.

According to an embodiment, distAlpha can be set according to:

$$\text{if } distAlpha < 0.5;\ distAlpha = 0.5;$$

$$\text{if } distAlpha > 1.0;\ distAlpha = 1.0.$$

Figure 12:
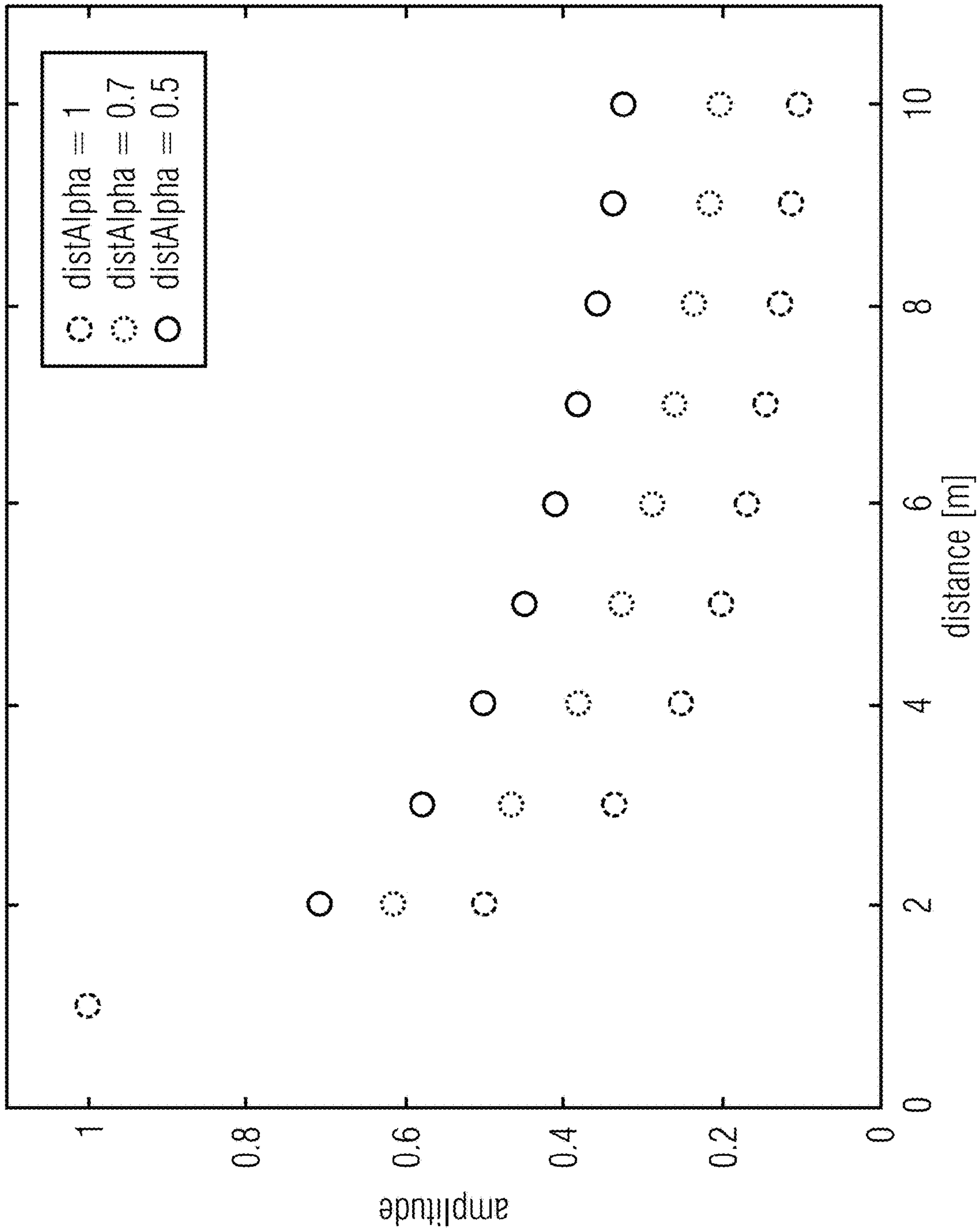
FIG. 12 shows an amplitude reduction over distance of a point source for different distAlpha values.

FIG. 12 shows an amplitude reduction over distance of a point source for different distAlpha values.

When the geometrical analysis is carried out in the encoder, then only the algorithmic parameters: predelay, compFactor and distAlpha have to be transferred to the render.

In the case that a more detailed geometrical analysis results in an ER pattern, which cannot be derived by the above defined equations, all single reflection positions and relative amplitudes can be transmitted independently to represent the desired pattern.

Example values from the geometrical analysis for different outdoor scenarios to calculate the ER pattern:

[preDelay, compFac, ampFac, distAlpha]

Outdoor field surrounded by rocks [144, 0.47, 2.2, 1]

Town street [109, 0.44, 1, 0, 65]

Park in town [57, 0.58, 1, 0, 58]

As already described above with regard to FIG. 2, according to an embodiment, the apparatus for audio rendering or for generating an early reflection pattern 1 may be configured to support different determinations of the early reflection pattern. The apparatus for audio rendering or for generating an early reflection pattern 1 may be configured to choose the type of determination dependent on the environment 5. According to an embodiment, the first determination may be performed as described in this section involving the placing of the early reflection positions ERP using the one or more control parameters 120. The first determination may be selected in case of the acoustic environment being an outdoor environment or in case of a pattern type index in a bitstream comprising a representation of an audio signal to be rendered assuming a predetermined state. Optionally, the second determination may be performed using one or more spiral functions, as described above. But it is clear that also other types of determination could be available for selection.

4 Behavior at Portals

A portal describes the border between one acoustic environment to the next, from one room to the next or from a room to a free-field environment. To make the transition through such portals smooth, a cross-fade processing between the associated simple ER patterns is beneficial. Within a region of e.g. d=5 m, the level of the contribution from one acoustic environment is faded out.

According to an embodiment, an apparatus for rendering may be configured to support a first manner of determination of the early reflection pattern 1 and a second manner of determination of the early reflection pattern 1, wherein the first manner of determination is different from the second manner of determination, e.g., see section 1 and the description of FIG. 2 for a first manner of determination and section 3 for a second manner of determination. The apparatus may be configured to use the first manner of determination or the second manner of determination in the determining the early reflection pattern 1 depending on a pattern type index. This index may be contained in the one or more early reflection pattern parameters.

5 Summation of Several Audio Sources into One ER Pattern

In a real environment, every audio source has its individual ER pattern, which is dependent on the source and receiver position. In the simplified simulation, every audio source in one environment has the same ER pattern, which is positioned around the listener. When source or listener moves, the source-listener distance changes and therefore the important level relation to the direct sound changes. This level relation has to be preserved.

Figure 13:
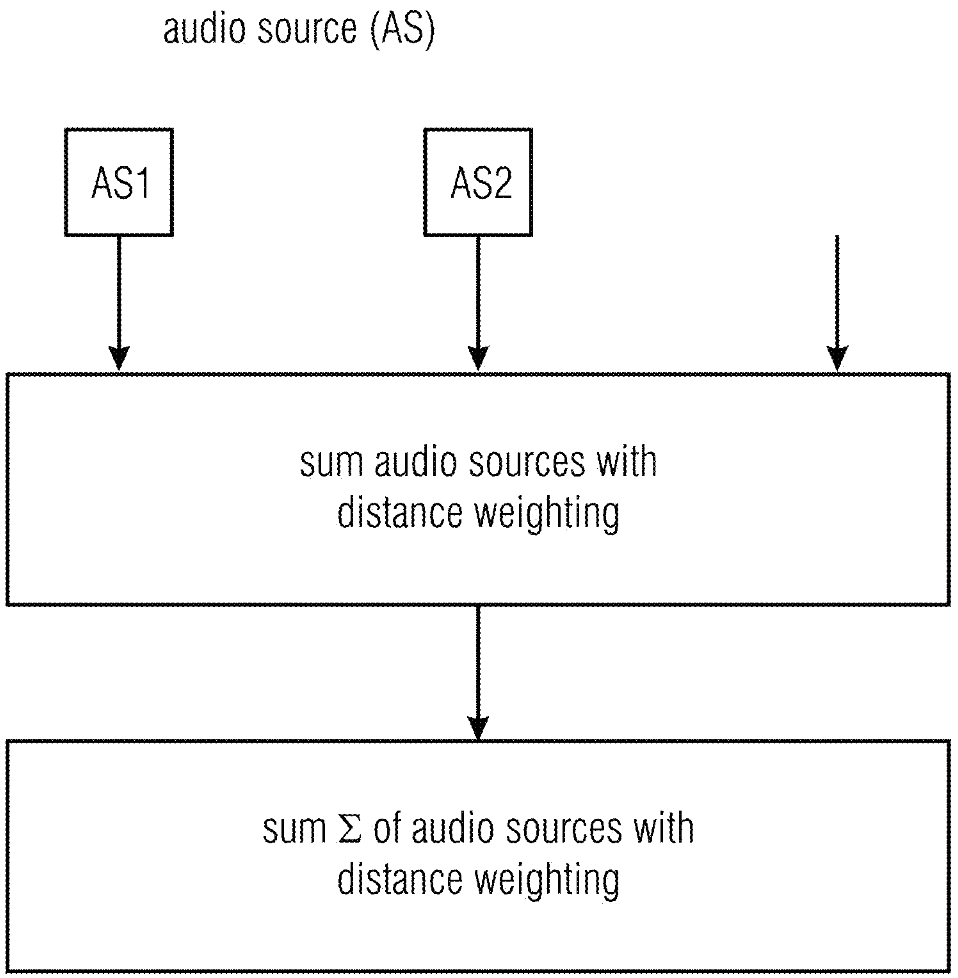
FIG. 13 shows a block diagram illustrating a summation of different audio sources into one source signal with distance weighting.

In an embodiment of the invention this can be accommodated in a computationally efficient way as described in FIG. 13. FIG. 13 shows a block diagram illustrating a summation of different audio sources (AS1, AS2, . . . ) into one source signal with distance weighting. First, the level relations between the different sources AS are considered based on the distance values between source and listener. Then the different audio sources AS can be summed up into a single source signal with the appropriate distance weighting. Thus, only one ER pattern 1 has to be auralized covering all audio sources AS in the simulated environment.

This pattern 1 follows the lateral movements of the listener (i.e. the translation in x, y, z direction but not the listener's head orientation). Specifically, when the listener moves into a certain direction, the locations ERP of the ERs in the ER patterns 1 move with the listener. They remain, however, in a constant predefined spatial orientation regardless of the listener's head orientation.

According to an embodiment, an apparatus for audio rendering or for generating an early reflection pattern 1 may be configured to render an audio signal of two or more sound sources using a room impulse response whose early reflection portion is determined by an early reflection pattern by forming a weighted sum of a first audio signal of a first sound source positioned at the first sound source position and a second audio signal of a second sound source positioned at the second sound source position and by generating early reflection contribution loudspeaker signals relating to the early reflection portion of the room impulse response by rendering the weighted sum from the early reflection positions. The weighted sum, for example, weights the first audio signal more than the second audio signal if a first distance between the first sound source position and the listener position is smaller than a second distance between the second sound source position and the listener position, and weights the second audio signal more than the first audio signal if the first distance is larger than the second distance.

According to an embodiment, the early reflection contribution loudspeaker signals relating to the early reflection portion of the room impulse response may be generated by rendering the weighted sum from each early reflection position in a manner level adjusted according to a distance of the respective early reflection position to the listener position.

Figure 14:
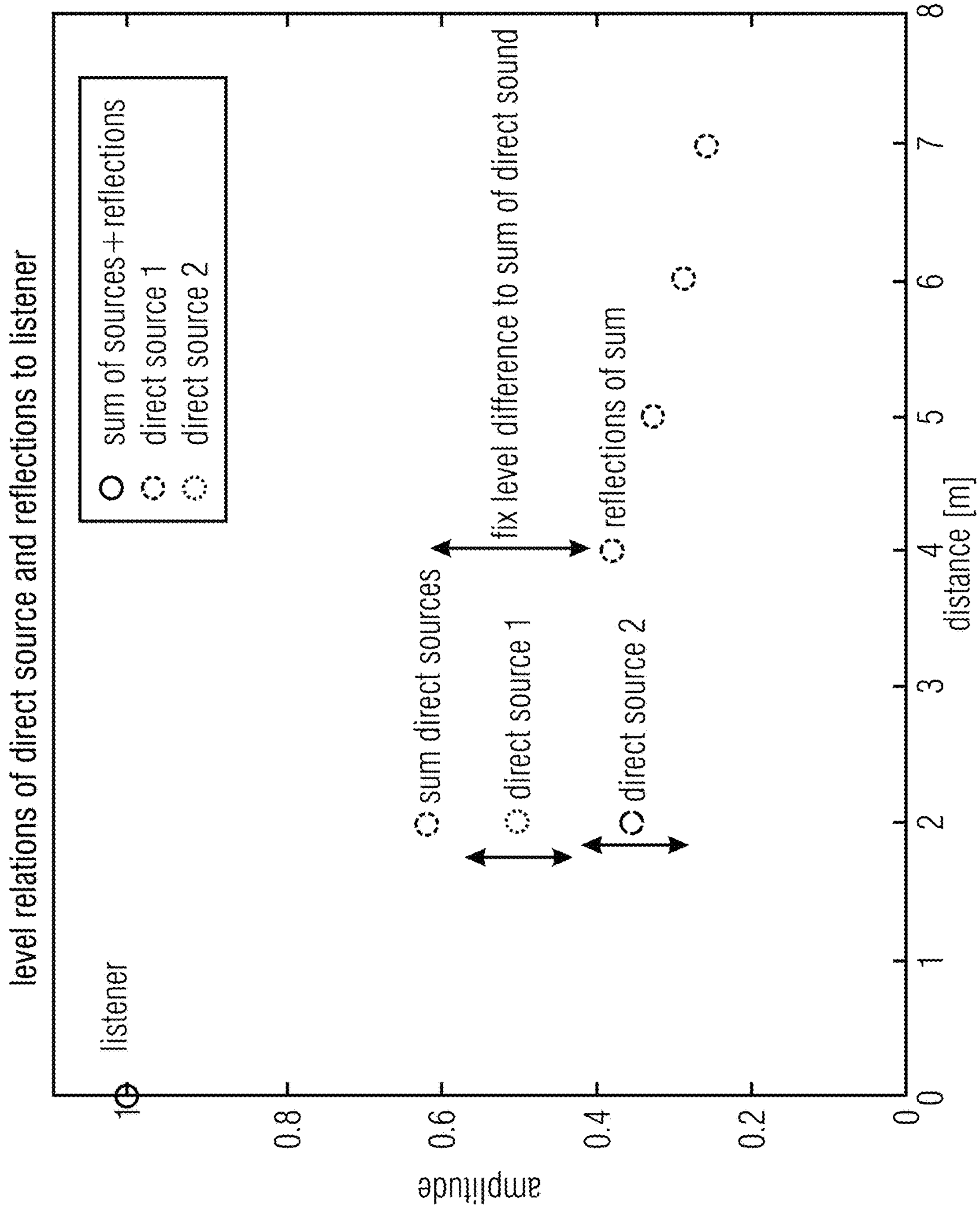
FIG. 14 shows a level relation between the listener, two direct sources and the summed up reflections.

In FIG. 14 the level relation between the listener, two direct sources and their reflections is visualized. The level of each direct source is dependent on its individual source listener distance. These can vary individually. The common level of the direct sources is calculated by summing up the individual levels. From this level the related reflections are calculated by their distances.

FIG. 14 shows a level relation between the listener, two direct sources and the summed up reflections.

The reduction caused by the source listener distance is individual per source. There is an additional ampCorrection for the complete ER pattern $$ampCorrection = ampFac \cdot (1 - \text{absorption}) \quad \text{Eq. 8}$$

6 Brief Summary

6.1 Rendering Aspects

A renderer that is equipped to render early reflection patterns in a virtual auditory environment which

- do not depend on detailed room geometry description, e.g., only room dimensions and/or room volume and/or predelay to the late reverberation may be considered.
- do not depend on individual source and listener location (share the same ER pattern for every audio source in one environment), only the source listener distance.
- rendered at fixed locations, e.g., at the early reflection positions ERP, relative to the user (rather than at locations in space depending on the source and listener location)
  - In an embodiment, the locations of the pattern's ERs, i.e. the early reflection positions ERP, follow the lateral movements of the listener (i.e. the translation in x, y, z direction but not the listener's head orientation). Specifically, when the listener moves into a certain direction, the locations of the ERs in the ER patterns move with the listener. They remain, however, in a constant predefined spatial orientation regardless of the listener's head orientation.

Figure 15:
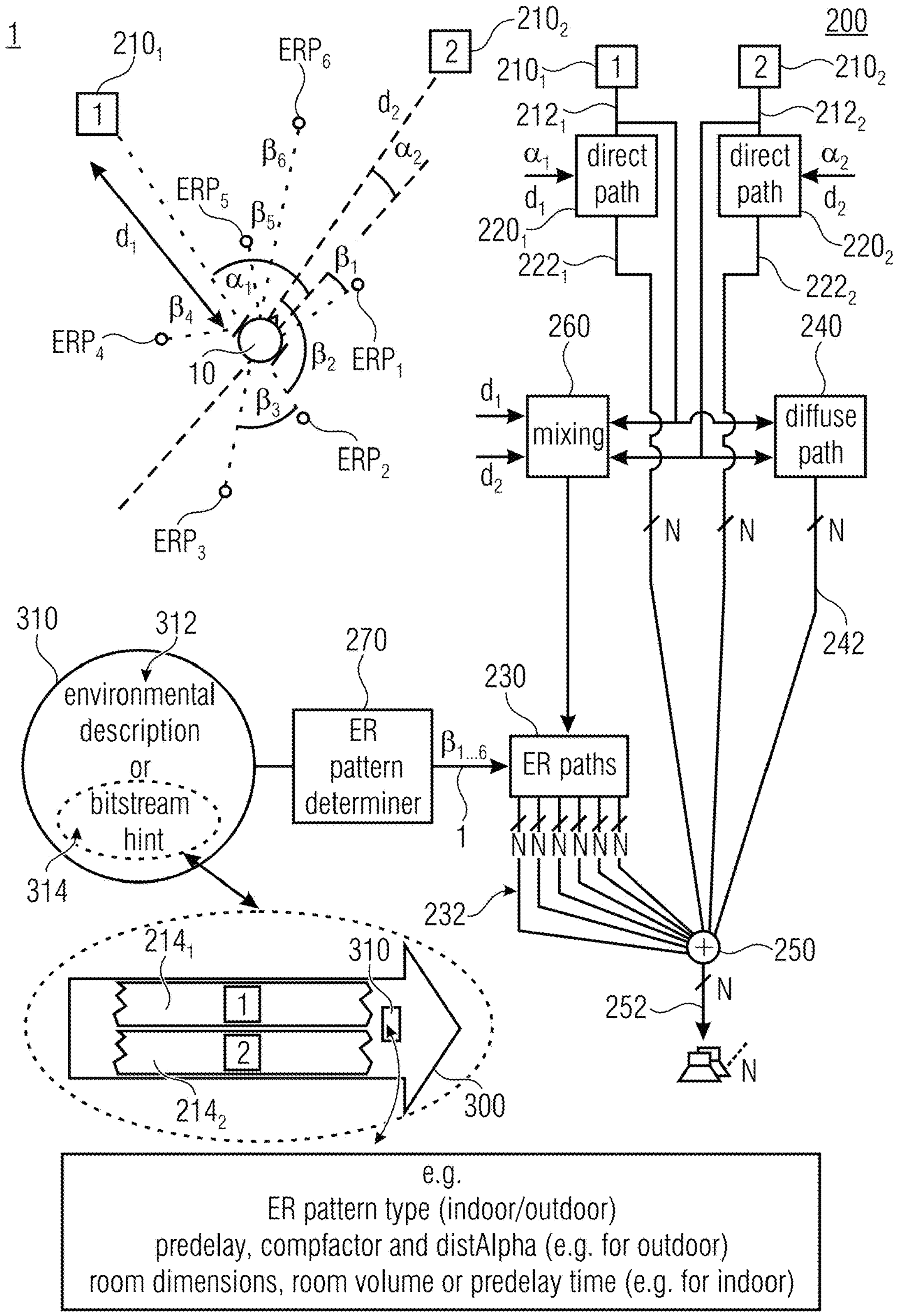
FIG. 15 illustrates the overall rendering process exemplarily.

FIG. 15 illustrates the overall rendering process exemplarily. One or more of the features described with regard to FIG. 15 may be comprised by a herein described apparatus for sound rendering.

FIG. 15 shows an apparatus 200 for sound rendering. The apparatus 200 is configured to render one or more audio signals $\mathbf{212_1/212_2}$ of one or more sound sources $\mathbf{210_1/210_2}$. An audio signal 212, see $\mathbf{212_1}$ and $\mathbf{212_2}$, can be rendered by considering direct sound, see 2201 and 2202, early reflections, see 230, and/or late reverberation, see 240.

At the direct path $\mathbf{220_1/220_2}$ the one or more audio signals $\mathbf{212_1/212_2}$ may be rendered to obtain for each of the one or more audio signals $\mathbf{212_1/212_2}$ a direct sound contribution loudspeaker signal $\mathbf{222_1/222_2}$. For example, for each of the audio signals $\mathbf{212_1}$ and $\mathbf{212_2}$ to be rendered a distance $d_1/d_2$ between the respective associated sound source $\mathbf{210_1/210_2}$ and a listener position 10 as well as an angle $\alpha_1/\alpha_2$ between the respective sound source $\mathbf{210_1/210_2}$ and an orientation of the listener may be considered to determine the respective direct sound contribution loudspeaker signal $222_1$/$222_2$. The direct sound contribution loudspeaker signals $222_1$/$222_2$ relate to a direct sound source portion of a room impulse response.

According to an embodiment, the apparatus 200 may be configured to mix 260 the one or more audio signals $212_1$/$212_2$ of the one or more sound sources $210_1$/$210_2$ to obtain a mixed audio signal 262. At the mixing 260, the signals $212_1$/$212_2$ may be panned dependent on the position of the respective associated sound source $210_1$/$210_2$. For example, for each of the audio signals $212_1$/$212_2$, a distance $d_1/d_2$ between the respective associated sound source $210_1$/$210_2$ and the listener position 10 is considered at the panning/mixing 260. Alternatively, or additionally, the mixing may be performed as described in section 5.

The apparatus 200 is configured to render an audio signal, e.g., the mixed audio signal 262, e.g., a weighted sum of the audio signals $212_1$ and $212_2$, of the one or more sound sources $210_1$/$210_2$ using the room impulse response whose early reflection portion is determined by an early reflection pattern 1, e.g., at the ER paths 230, e.g., to obtain early reflection contribution loudspeaker signals 232 relating to the early reflection portion of the room impulse response. The early reflection contribution loudspeaker signals 232 may be generated by performing a rendition of the audio signal from the early reflection positions ERP, see $ERP_1$ to $ERP_6$.

Optionally, the apparatus 200 may comprise an ER pattern determiner 270, e.g., an apparatus for generating an early reflection pattern 1. The determination of the early reflection pattern 1 may be performed as described in one of the above mentioned embodiments, e.g., see FIG. 2 and sections 1, 3 and 5. The ER pattern determiner 270 may obtain ER pattern information 310 for generating the early reflection pattern 1. The ER pattern information 310 may comprise one or more of an ER pattern type (indoor/outdoor); a predelay, a compfactor and/or distAlpha (e.g., for outdoor); and room dimensions, room volume and/or predelay time (e.g., for indoor). For example, depending on the determination to be used by the ER pattern determiner 270, the ER pattern determiner 270 receives or reads from a bitstream 300 an environmental description 310, e.g. one or more room acoustical parameters or one or more control parameters, or a bitstream hint 320, e.g., one or more early reflection pattern parameters.

The bitstream 300 may comprise a representation $214_1$ of the audios signal $212_1$ associated with the first sound source $210_1$ and a representation 2142 of the audios signal $212_2$ associated with the second sound source $210_2$.

According to an embodiment, the bitstream 300 may contain/comprise one or more of the herein mentioned parameters. The bitstream 300 may comprise a representation of an audio signal $214_1$/$214_2$ of a sound source $210_1$/$210_2$ positioned at a sound source position and comprising one or more early reflection pattern parameters. For example, the bitstream 300 is an audio bitstream with the early reflection parameter inside a header or metadata field of the bitstream, or a file format stream with the early reflection parameter inside a packet of the file format stream and a track of the file format stream comprising an audio bitstream representing the audio signal. The one or more early reflection pattern parameters comprise one or more of an pattern type index, a predelay time to late reverberation, a compression factor, an amplitude correction factor, a distance attenuation exponent, a pattern azimuth parameter, and one or more frequency response parameters.

At the ER path 230, i.e. at the generation of the early reflection contribution loudspeaker signals 232, the apparatus 200 is optionally configured to render the audio signal of the one or more sound sources $210_1$/$210_2$ from each early reflection position ERP in a manner spectrally shaped according to one or more frequency response parameters (see FIG. 3C). In FIG. 3C the circles (blue) show the frequency dependency of RT60. The same frequency dependency can be applied on all early reflections. Another frequency dependency can be applied by a bass boost for wall proximity (<2 m) of source or receiver. The one or more frequency response parameters can be contained in a bitstream, which can also comprise a representation of the audio signal or of the individual signals $212_1$ and $212_2$ of the sound sources $210_1$/$210_2$. The one or more frequency response parameters may be contained in one or more early reflection pattern parameters.

The apparatus 200, may be configured to, in performing the rendition of the audio signal of the one or more sound sources $210_1$/$210_2$ from the early reflection positions ERP, use HRTFs specific for a listener head orientation. The HRTF represents a head related transfer function.

At the optional diffuse path 240 the one or more audio signals $212_1$/$212_2$ may be rendered to obtain diffuse late reverberation loudspeaker signals 242. The apparatus 200 may be configured to generate a diffuse late reverberation portion of the room impulse response and, for example, use this room impulse response to render the one or more audio signals $212_1$/$212_2$ in the diffuse path 240. The diffuse late reverberation loudspeaker signals 242 relate to the diffuse late reverberation portion of the room impulse response.

The apparatus 200 may be configured to, in rendering the one or more audio signals $212_1$/$212_2$, generate a set of loudspeaker signals 252 by forming a summation 250 over direct sound contribution loudspeaker signals $222_1$/$222_2$ relating to a direct sound source portion of the room impulse response and early reflection contribution loudspeaker signals 232 relating to the early reflection portion of the room impulse response and, optionally, diffuse late reverberation loudspeaker signals 242 relating to the diffuse late reverberation portion of the room impulse response.

Indoor Rendering a) ER patterns, which cover the gap between direct sound and the start of the late reverb
b) ER patterns, which are distributed in the horizontal plane.
c) ER patterns, which are controlled by room acoustical parameters like room dimensions, room volume, predelay time to the late reverb, RT60 to set the number of them, their spacing, their amplitude behavior over distance.
d) ER patterns, which can have between 2 and 20 ERs.
e) ER, for which the positions are determined by spirals.
f) ER, for which the positions are determined by two spiral arms.
g) ER, for which the positions are determined by $$\beta 1 = n \cdot \frac{\pi}{3},\ \beta 2 = \frac{\pi}{8} + n \cdot \frac{\pi}{3},$$

$$n = [1{:}nER/2] \text{ with } nER = \text{number of } ER \text{ base} = 1.85$$

$$r1 = distfactor * \text{base}^{2*\beta 1/\pi}$$

$$r2 = distfactor * \text{base}^{2*\beta 2/\pi}$$

h) ER, for which the positions are randomly spread over azimuth up to the predelay time.

i) The ER pattern keeps constant independent from source and receiver positions in the room. Note that the form of the pattern keeps constant, but it moves with the listener. And the amplitude of the reflection is dependent on the source listener distance.

j) Use a reduced floor reflection to create a specific sound character.

Outdoor Rendering k) Sparse ER patterns, specifically for outdoor scenes, with e.g. 2-6 reflections.

l) Use a geometrically analysis of the reflective surfaces of a whole scene to derive the level and predelays for the ER outdoor patterns.

m) Use the summarized distribution over distance to derive the ER pattern parameters.

n) Do this analysis over a mesh of possible listening positions in the user reachable area.

o) Use the first two peaks of such a distribution, together with the corresponding distances p) Calculate the predelay, the compression factor and the distAlpha from this distribution values.

General q) Apply a level fade-in and -out of the ER pattern level when changing from one acoustic scene and/or room to another.

6.2 Transmission, Bitstream and Signaling Aspects a) The indoor scenes can be calculated entirely in the decoder/renderer with the room acoustical parameters given by the scene.

b) Specifically, outdoor scenes can benefit from a geometrical analysis in the encoder. Only the control parameters of the pattern have to be transmitted. In an embodiment, the parameters include: (algorithm/pattern number, predelay to late reverb, compression factor for pattern compared to predelay, amplitude correction factor, distance attenuation exponent, pattern azimuth parameter, frequency response description)

c) For the case new ER patterns should be used, these can be calculated completely in the encoder and can then transmitted to the decoder. They are defined by temporal position and relative level of the reflections (regarding the normal distance attenuation) (number of ER, for each: azimuth, elevation, radius, amplitude correction factor, distance attenuation exponent, frequency response description).

d) Decoders/renderers can be pre-equipped with a number of ER patters. In this case, the bitstream signaling includes a field indicating which pre-supplied ER pattern should be used. Furthermore, the parameters for this pattern are signaled, as described in b. 1

7 Application Fields

The time consuming exact geometrical calculation of ER can especially be avoided in applications like Real-time auditory virtual environment Real-time augmented reality

8 Further Embodiments

Figure 16:
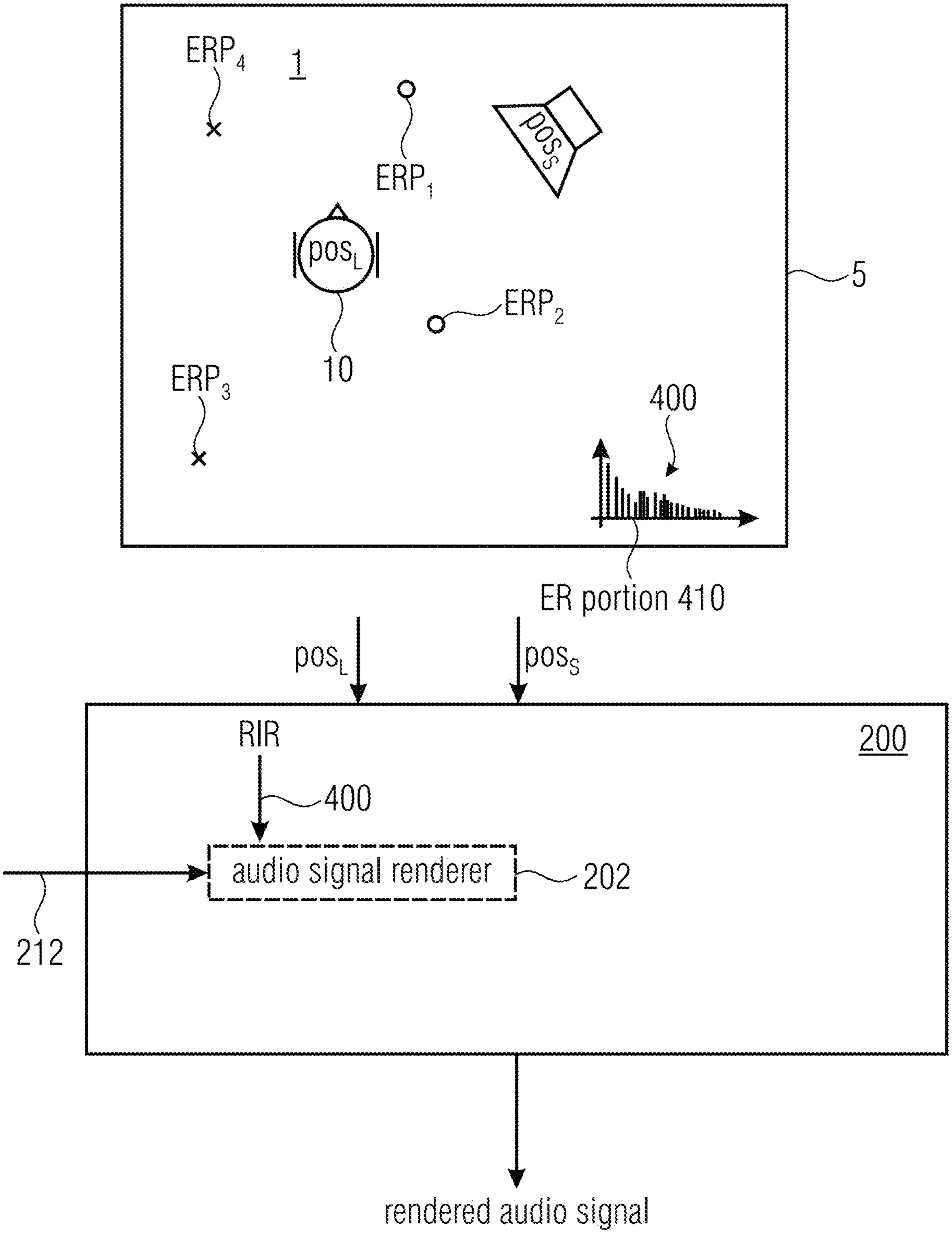
FIG. 16 shows an embodiment of an apparatus for sound rendering.

FIG. 16 shows an embodiment of an apparatus 200 for sound rendering, configured to receive information on a listener position 10 and a sound source position poss. This information may be used to determine a distance d between the listener and the sound source. Optionally, the apparatus 200 may be configured to use the distance as described with regard to the apparatus 200 in FIG. 15. The apparatus 200 is configured to render 202 an audio signal 212 of the sound source using a room impulse response 400 whose early reflection portion 410 is exclusively determined by an early reflection pattern 1. The early reflection pattern 1 is indicative of a constellation of early reflection positions ERP, see $ERP_1$ to $ERP_4$, and is positioned at the listener position 10 in a manner so that the early reflection positions ERP are located around the listener position 10 and at angular directions from the listener position 10 which are invariant with respect to changes in a listener head orientation.

The apparatus 200 can comprise any of the features described above. For example, the apparatus 200 can comprise the apparatus 100 of FIG. 6, FIG. 18 or of FIG. 20 for determining the early reflection pattern for sound rendition. Alternatively, the apparatus 200 can comprise a different apparatus for determining the early reflection pattern for sound rendition, e.g., an apparatus configured to perform the determination as described with regard to FIG. 2 and/or as described in sections 1, 3 and 5.

Figure 17:
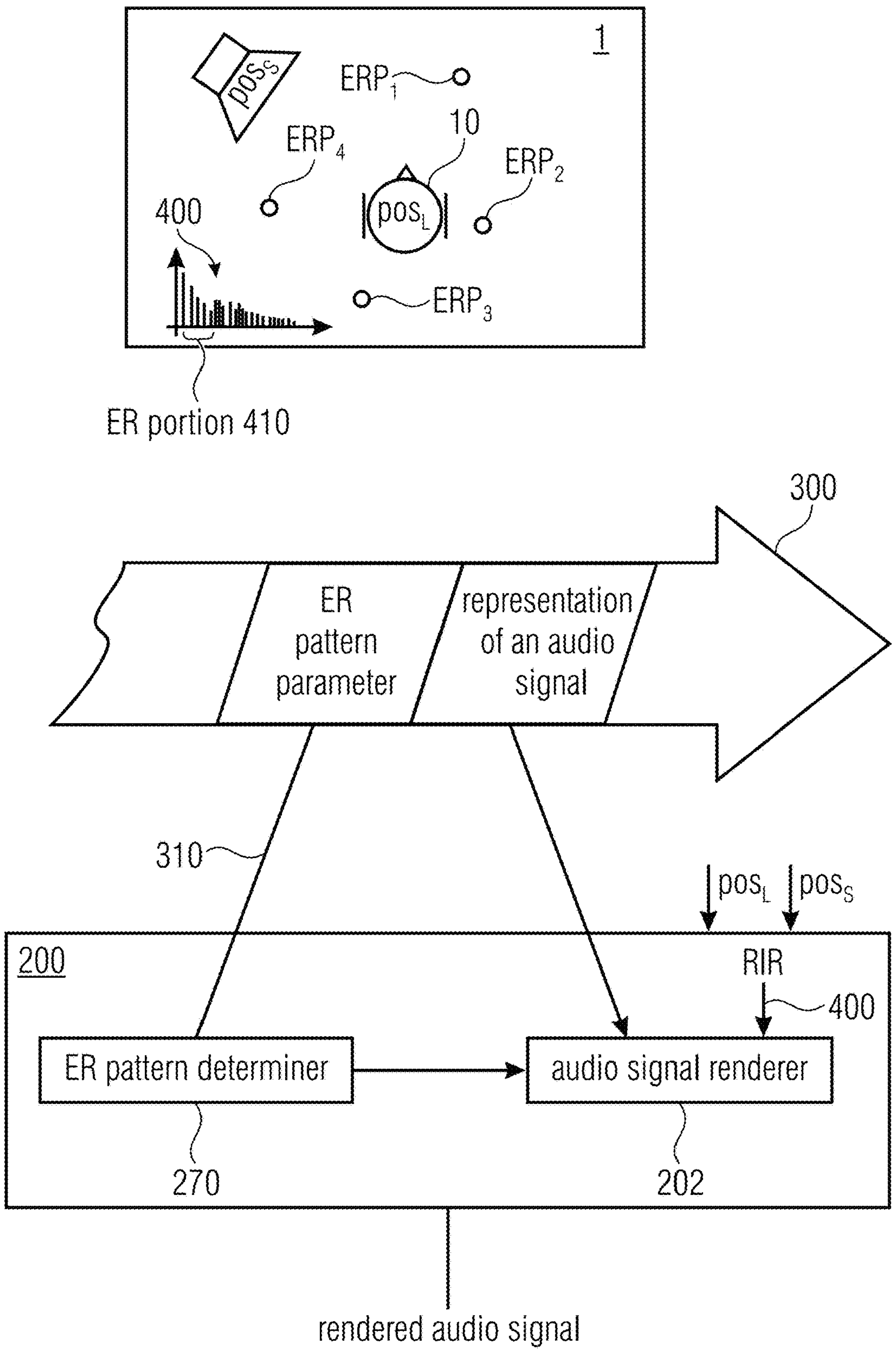
FIG. 17 shows an embodiment of an apparatus for sound rendering using ER pattern parameter.

FIG. 17 shows an embodiment of an apparatus 200 for sound rendering, configured to receive first information on a listener position 10 and a sound source position poss. This information may be used to determine a distance d between the listener and the sound source. Optionally, the apparatus 200 may be configured to use the distance as described with regard to the apparatus 200 in FIG. 15. The apparatus 200 is configured to receive a bitstream 300 comprising, e.g. and read therefrom, a representation 214 of an audio signal of a sound source positioned at the sound source position $pos_s$ and one or more early reflection pattern parameters 310. The bitstream 300, for example, is an audio bitstream with the early reflection parameter 310 inside a header or metadata field of the bitstream 300, or a file format stream with the early reflection parameter 310 inside a packet of the file format stream and a track of the file format stream comprising an audio bitstream representing the audio signal.

The one or more early reflection pattern parameters 310 may comprise one or more of an pattern type index, a predelay time to late reverberation, a compression factor, an amplitude correction factor, a distance attenuation exponent, a pattern azimuth parameter, one or more frequency response parameters.

Additionally, the apparatus 200 is configured to determine 270 an early reflection pattern 1 depending on the one or more early reflection pattern parameters 310, e.g., as described with regard to FIG. 2 and/or as described in sections 1, 3 and 5. The early reflection pattern 1 is indicative of a constellation of early reflection positions ERP, see $ERP_1$ to $ERP_4$. For example, the apparatus 300 may be configured to perform the determining 270 of the early reflection pattern 1 so that the number of the early reflection positions ERP is larger the larger a predelay time to the late reverberation is. Additionally, or alternatively, the apparatus 200 is configured to perform the determining 270 of the early reflection pattern 1 so that a farthest early reflection position ERP from the listener position 10 is larger the larger a predelay time to the late reverberation is. The distance may be smaller than the predelay time.

Further the apparatus 200 is configured to render 202 the audio signal of the sound source using a room impulse response 400 whose early reflection portion 410 is determined by an early reflection pattern 1 The early reflection pattern 1 is indicative of a constellation of early reflection positions ERP, see $ERP_1$ to $ERP_4$, and is positioned at the listener position 10 in a manner so that the early reflection positions ERP are located around the listener position and at angular directions from the listener position 10 which are invariant with respect to changes in listener head orientation.

According to an embodiment, the apparatus 200 is configured to, if a pattern type index indicates an encoder-parametrized manner of determination, e.g., as described in section 1, read from the bitstream 300 as part of the one or more early reflection pattern parameters 310 one or more of a number of the early reflections of the early reflection pattern, for each early reflection, an azimuth, an elevation, a radius, e.g., distance to listener position, for each early reflection, an amplitude correction factor, for each early reflection, a distance attenuation exponent and for each early reflection, a frequency response description.

The apparatus 200 can comprise any of the features described above.

Figure 18:
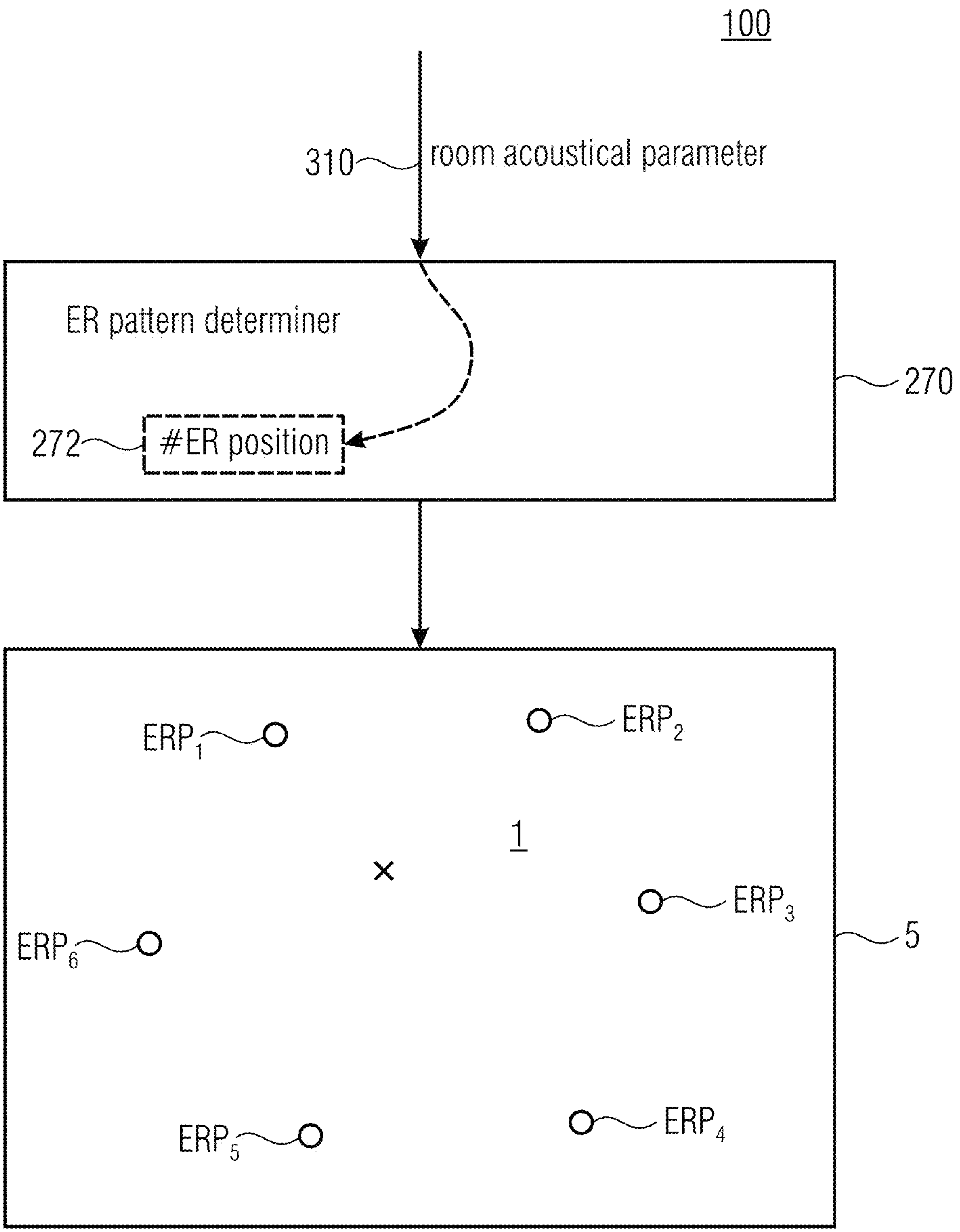
FIG. 18 shows an embodiment of an apparatus for determining an ER pattern dependent on a room acoustical parameter.

FIG. 18 shows an embodiment of an apparatus 100 for determining an early reflection pattern 1 for sound rendition, configured to receive at least one room acoustical parameter 310 which is representative of an acoustical characteristic of an acoustic environment 5.

The apparatus 100 is configured to determine 270 the early reflection pattern 1 in a manner so that a number 272 of the early reflection positions ERP, see $ERP_1$ to $ERP_6$ depends on the at least one room acoustical parameter 310. The early reflection pattern 1 is indicative of a constellation of early reflection positions. The apparatus 100 can comprise especially the features described above with regard to FIG. 2 and sections 1 and 5.

Figure 19:
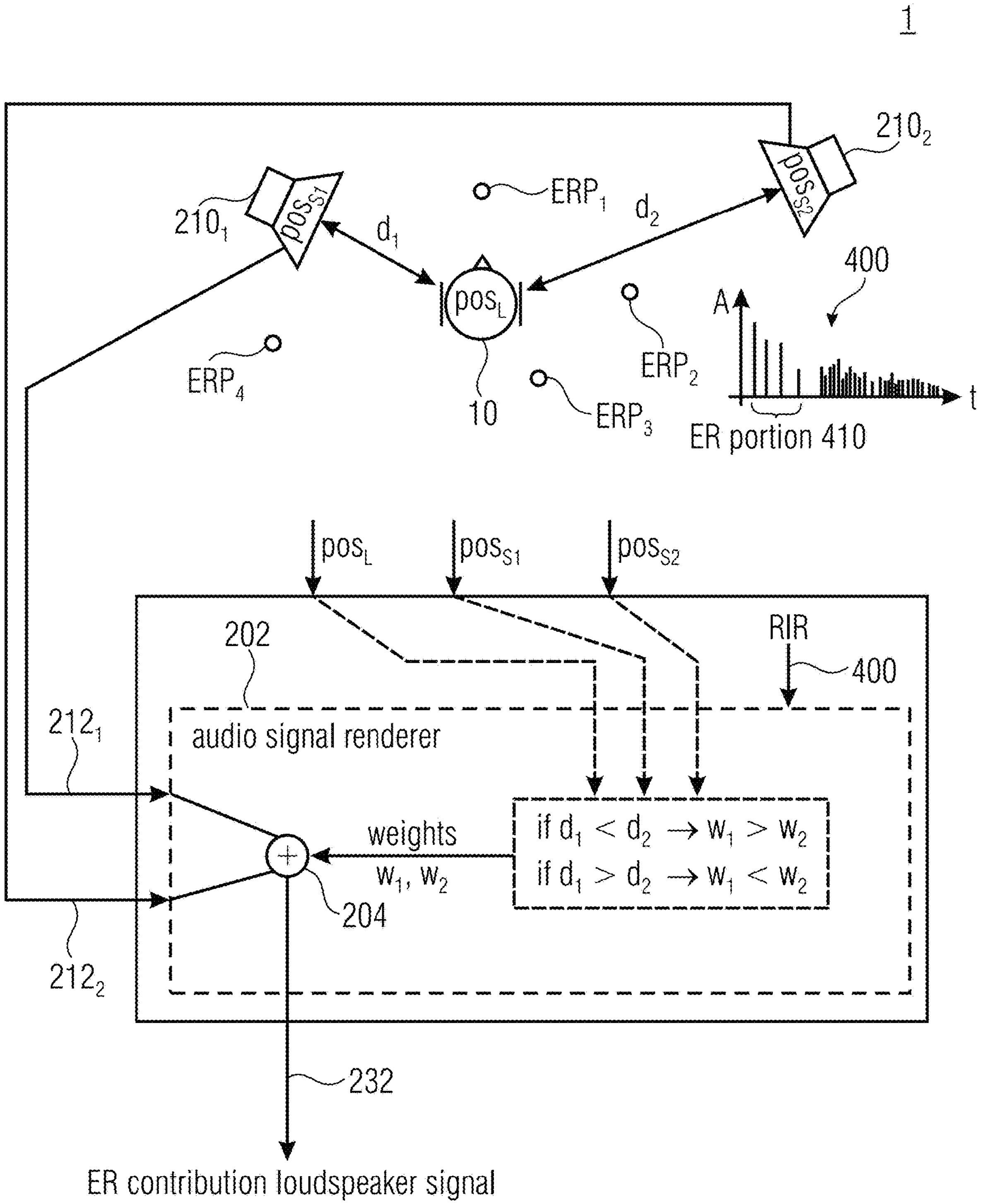
FIG. 19 shows an embodiment of an apparatus for rendering a weighted sum of two or more source signals.

FIG. 19 shows an embodiment of an apparatus 200 for sound rendering, configured to receive information on a listener position 10, a first sound source position $pos_{S1}$ and a second sound source position $pos_{S2}$. The apparatus 200 is configured to render 202 audio signals $\mathbf{212}_1$ and $\mathbf{212}_2$ of the two sound sources $\mathbf{210}_1$ and $\mathbf{210}_2$ using a room impulse response 400 whose early reflection portion 410 is determined by an early reflection pattern 1. The early reflection pattern 1 is indicative of a constellation of early reflection positions ERP, see $ERP_1$ to $ERP_4$, and is positioned at the listener position 10 in a manner so that the early reflection positions ERP are located around the listener position 10 and at angular directions from the listener position 10 which are invariant with respect to changes in listener head orientation. The rendering 202 is further performed by forming a weighted sum 204 of a first audio signal $\mathbf{212}_1$ of a first sound source $\mathbf{210}_1$ positioned at the first sound source position $pos_{S1}$ and a second audio signal $\mathbf{212}_2$ of a second sound source $\mathbf{210}_2$ positioned at the second sound source position $pos_{S2}$. The weighted sum 204 weights $w_1$ the first audio signal $\mathbf{212}_1$ more than the second audio signal $\mathbf{212}_2$ if a first distance $d_1$ between the first sound source position $pos_{S1}$ and the listener position 10 is smaller than a second distance $d_2$ between the second sound source position $pos_{S2}$ and the listener position 10, and weights $w_2$ the second audio signal $\mathbf{210}_2$ more than the first audio signal $\mathbf{210}_1$ if the first distance $d_1$ is larger than the second distance $d_2$. Additionally, the rendering is performed by generating early reflection contribution loudspeaker signals 232 relating to the early reflection portion 410 of the room impulse response 400 by rendering the weighted sum 204 from the early reflection positions ERP. The apparatus 200 can especially, comprise features described in section 5. However, it is clear that the apparatus 200 can also comprise an apparatus for determining the ER pattern 1 as described in any of the embodiments above.

Figure 20:
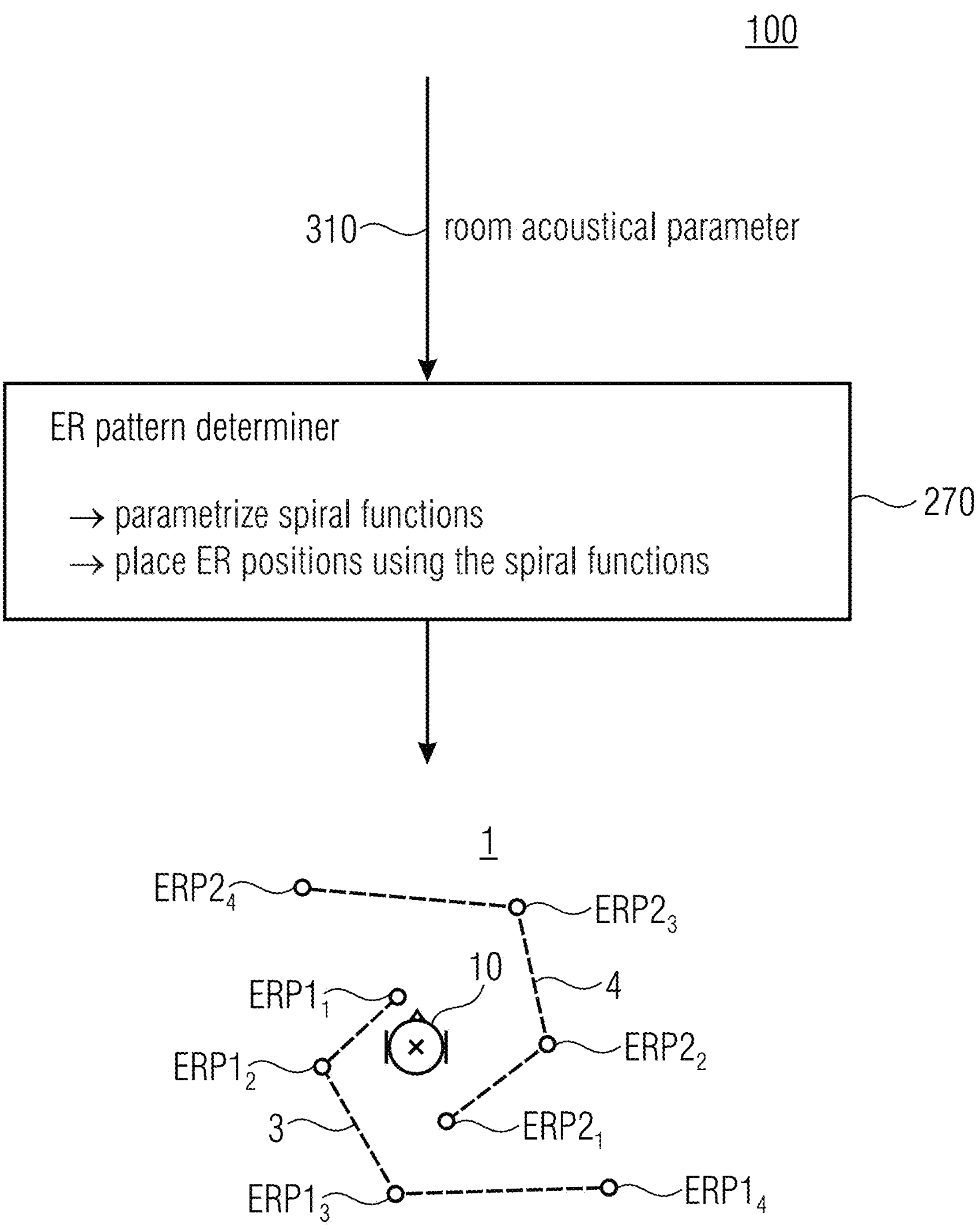
FIG. 20 shows an embodiment of an apparatus for determining an ER pattern using spiral functions.
Figure 21:
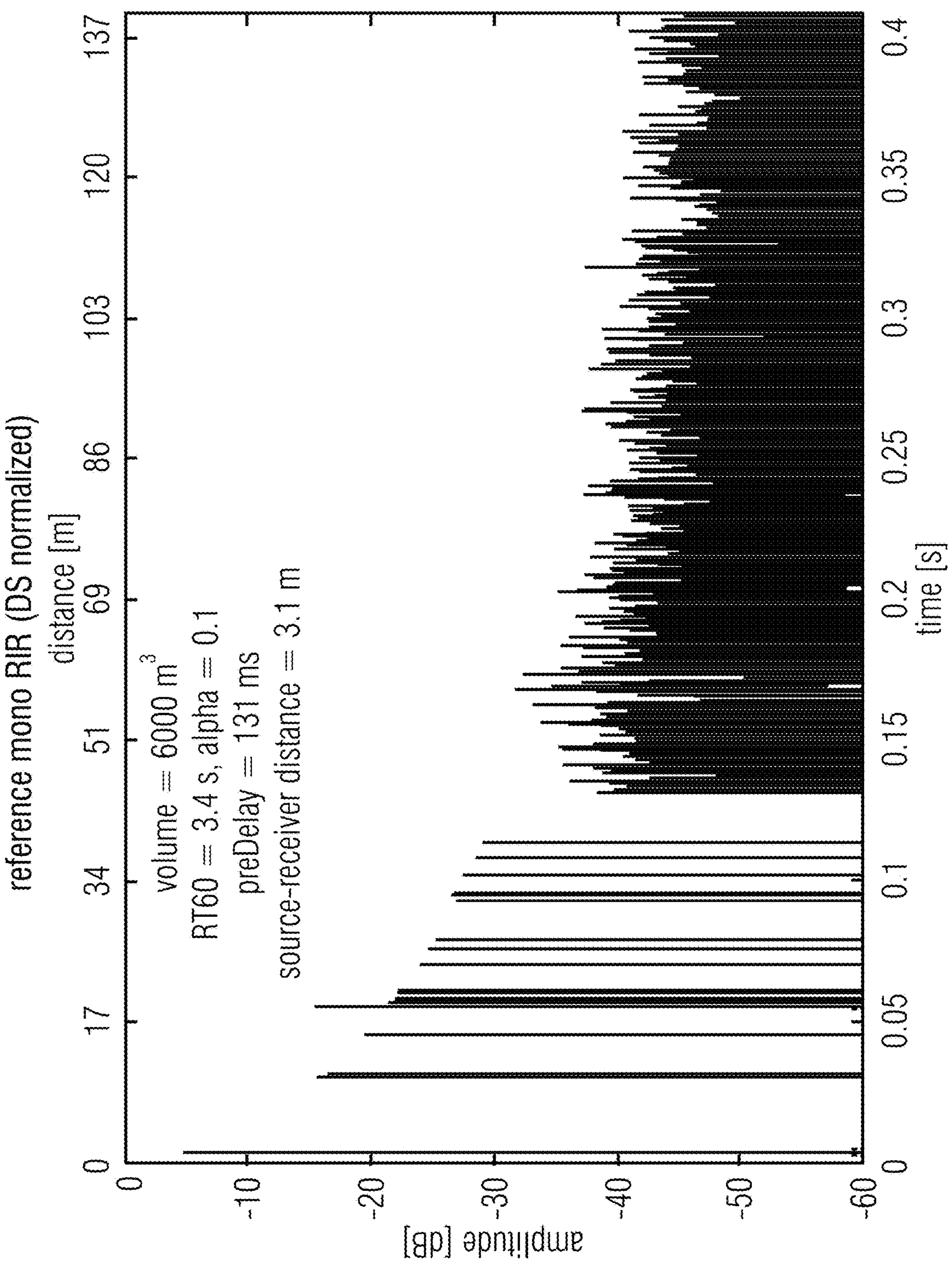
FIG. 21 shows an example for a monophonic $2^{nd}$ order RIR generated with the acoustical room simulation program RAVEN.
Figure 22:
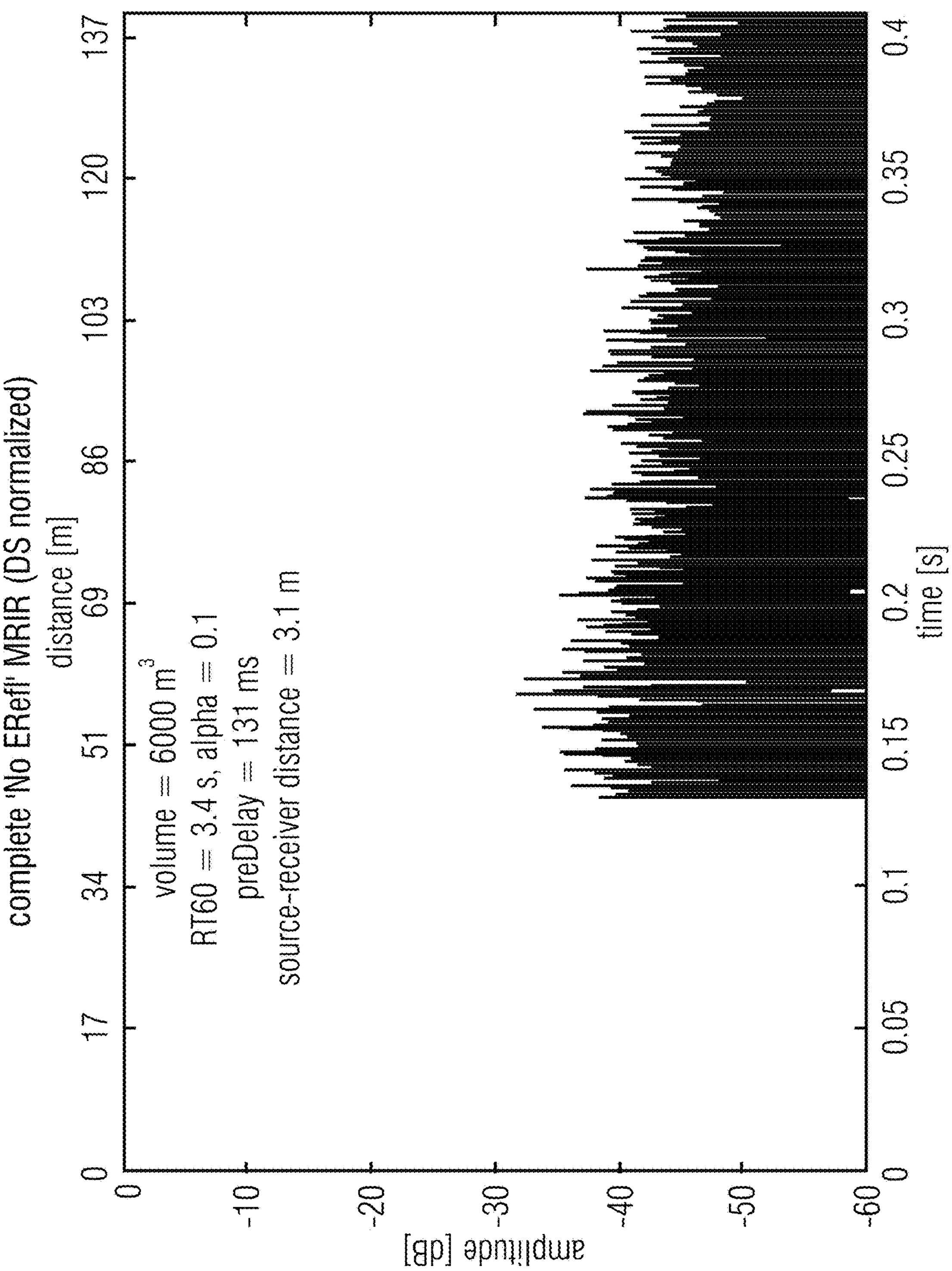
FIG. 22 shows a RIR with direct sound and late reverb starting at predelay time 0.13 s, no ER.
Figure 23:
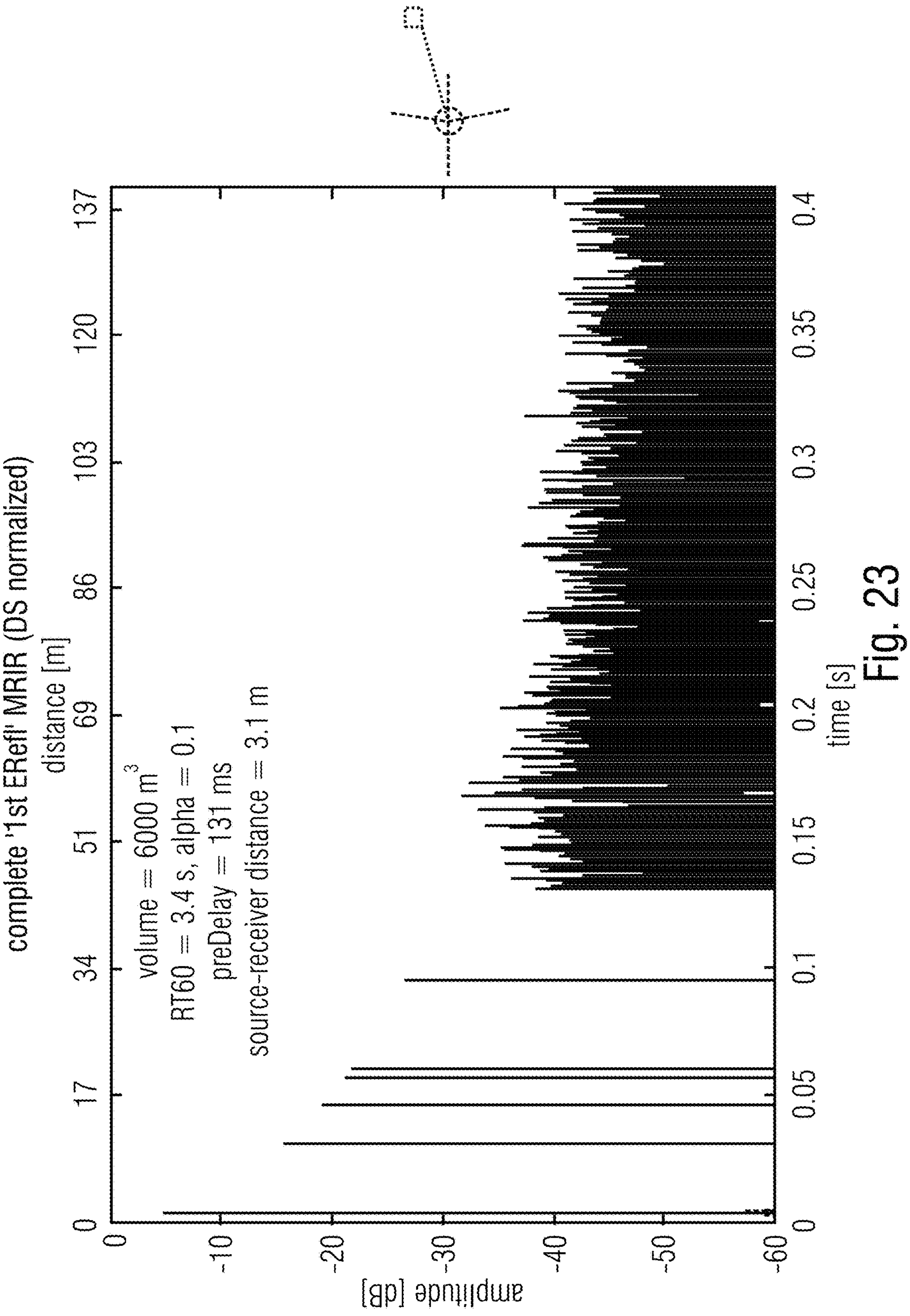
FIG. 23 shows a RIR with $1^{st}$ order reflections and late reverb (left), top view (right)
Figure 24:
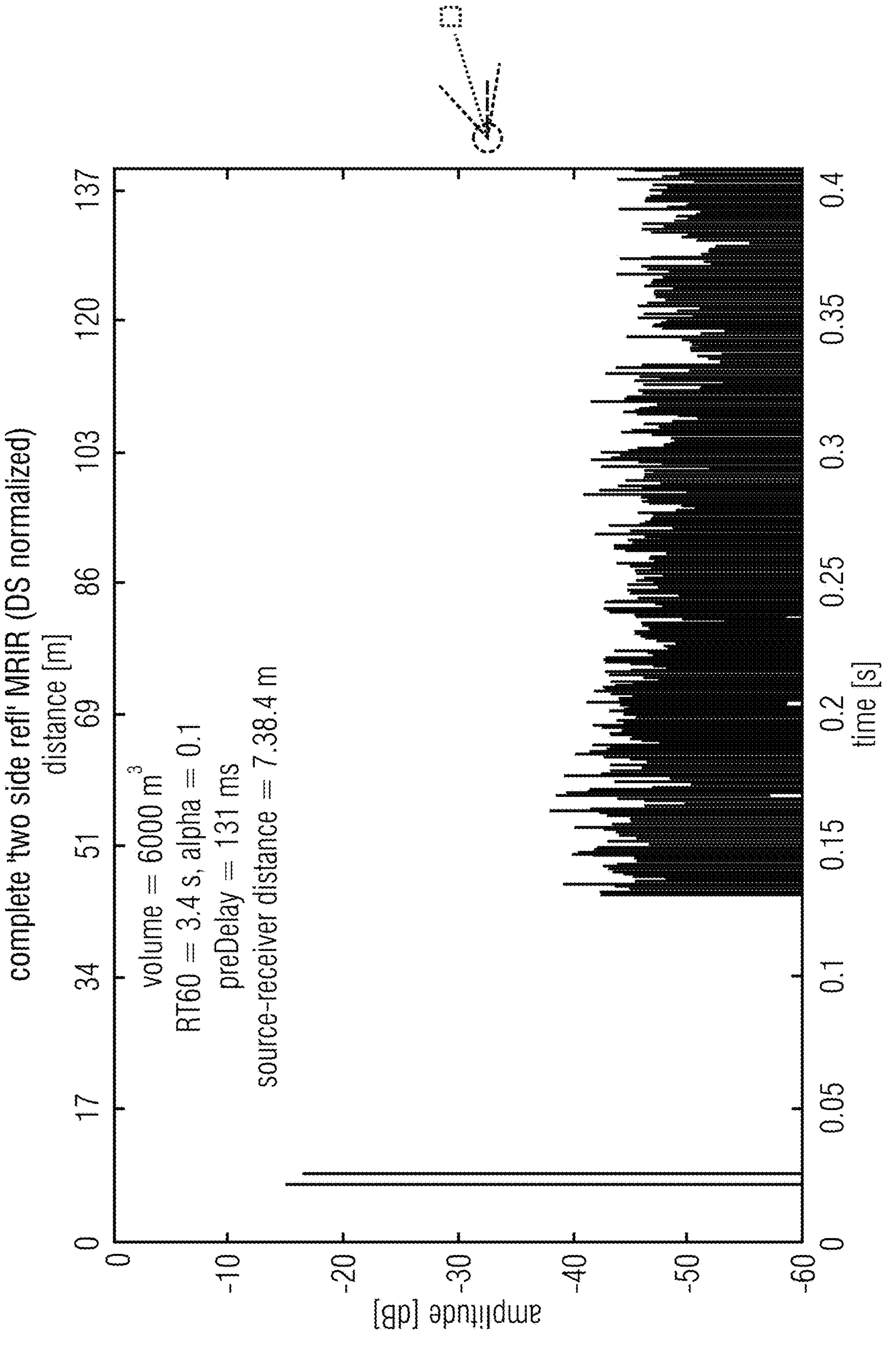
FIG. 24 shows a RIR with two reflections side by side to the direct sound (left), top view (right)

FIG. 20 shows an embodiment, of an apparatus 100 for determining 270 an early reflection pattern 1 for sound rendition, configured to receive at least one room acoustical parameter 310 which is representative of an acoustical characteristic of an acoustic environment 5. The apparatus 100 is configured to determine 270 the early reflection pattern 1 by parameterizing one or more spiral functions 3 and 4 centered at the listener position 10, and by placing the early reflection positions ERP, see $ERP1_1$ to $ERP1_4$ and $ERP2_1$ to $ERP2_4$, using the one or more spiral functions 3 and 4. The early reflection pattern 1 is indicative of a constellation of the early reflection positions ERP. The apparatus 100 can comprise especially features as described with regard to FIG. 2 and section 1, but it is clear that the apparatus can also comprise other herein described features.

9 Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive rendered audio signal or the invented early reflection pattern information can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

10 Literature

[1] Jot, J.-M., Real-time spatial processing of sounds for music, multimedia and interactive human-computer interfaces. Audio and Multimedia, 1997 (*ACM Multimedia* Systems Journal, February 1997). Available from: http://citeseerx.ist.psu.edu/viewdoc/download?doi=10.1.1.54.6319&rep=rep1&type=pdf.

[2] Jullien, J. P., E. Kahle, S. Winsberg, and O. Warusfel, Some Results on the Objective Characterisation of Room Acoustical Quality in Both Laboratory and Real Environments, 1992, IRCAM, France. Available from: https://kahle.be/articles/IRCAM_Room_Acoustical_Quality_1992.pdf.

[3] Jot, J.-M., O. Warusfel, E. Kahle, and M. Mein. Binaural Concert Hall Simulation in Real Time. IEEE 93. 1993. *Mohonk* (USA).

[4] Carpentier, T. A New Implementation of Spat in Max 15th Sound and Music Computing Conference (SMC2018) 2018. Limassol, Cyprus. https://hal.archives-ouvertes.fr/hal-02094499/document.

[5] Väänänen, R. and J. Huopaniemi, Advanced AudioBIFS: Virtual Acoustics Modeling in MPEG-4 Scene Description. IEEE Transactions on Multimedia, 2004. 6 (5): p. 661-675.

[6] Brinkmann, F., H. Gamper, N. Raghuvanshi, and I. Tashev. Towards Encoding Perceptually Salient Early Reflections for Parametric Spatial Audio Rendering. 148th AES Convention. 2020. Vienna, Austria.

[7] Brinkmann, F., et al., A Round Robin on Room Acoustical Simulation and Auralization. *J. Acoust. Soc. Am.,* 2019. 145 (4): p. 2746 . . . 2760 DOI: https://doi.org/10.1121/1.5096178.

[8] Bregman, A. S., Auditory Scene Analysis (The Perceptual Organization of Sound). 1990, MIT Press. ISBN: 9780262022972.

[9] Blauert, J., Spatial Hearing, The Psychophysics of Human Sound Localization. $2^{nd}$ ed. 1997, Cambrigde Massachusetts: MIT Press. ISBN: 0-262-02413-6.

[10] Angus, J. A. S., The Effects of Specular Versus Diffuse Reflections on the Frequency Response at the Listener. *J. Audio Eng. Soc.,* 2001. 49 (3): p. 125-133.

[11] Barron, M. and A. H. Marshall, Spatial Impression due to Early Lateral Reflections in Concert Halls: The Derivation of a Physical Measure. *Journal of Sound and Vibration,* 1981. 77 (2): p. 211-232.

[12] Bech, S. Perception of Reproduced Sound: Audibility of Individual Reflections in a Complete Sound Field. 96th AES Convention. 1994. Amsterdam, The Netherlands.

[13] Kuttruff, H., Room Acoustics (fourth edition). 2000: Spon Press. ISBN: 0-419-24580-4.

The invention claimed is:

1. An apparatus for determining an early reflection pattern for sound rendition, configured to receive at least one room acoustical parameter which is representative of an acoustical characteristic of an acoustic environment; and determine an early reflection pattern which is indicative of a constellation of early reflection positions, by parameterizing one or more spiral functions centered at a listener position, and placing the early reflection positions using the one or more spiral functions.

2. The apparatus of claim 1, wherein the early reflection pattern is for being positioned at the listener position in a manner so that the early reflection positions are located around the listener position and at angular directions from the listener position which are invariant with respect to changes in listener head orientation.

3. The apparatus of claim 1, wherein the at least one room acoustical parameter comprises one or more of room dimensions, room volume, and predelay time to a late reverberation.

4. The apparatus of claim 1, wherein the at least one room acoustical parameter comprises merely one parameter selected out of room dimensions, room volume, and predelay time to a late reverberation.

5. The apparatus of claim 1, wherein the one or more spiral functions comprise a first spiral function and a second spiral function wherein the apparatus is configured to place a first set of early reflection positions using the first spiral function and a second set of early reflection positions using the second spiral function so that each of the first set of early reflection positions is associated with a corresponding early reflection position of the second set of early reflection positions and is positioned on an opposite side of a line perpendicularly crossing a connecting line between the respective early reflection position of the first set of early reflection positions and the corresponding early reflection position of the second set of early reflection positions.

6. The apparatus of claim 5, wherein, for each of first set of early reflection positions, the corresponding early reflection position of the second set of early reflection positions is angularly offset relative to the connecting line into an angular direction which is common for all early reflection positions of the first set of early reflection positions.

7. The apparatus of claim 1, wherein the one or more spiral functions comprise a first spiral function and a second spiral function wherein the apparatus is configured to place a first set of early reflection positions using the first spiral function and a second set of early reflection positions using the second spiral function so that the first set of early reflection positions is determined in polar coordinates as ($r1$; $\beta 1$) and the second set of early reflection positions is determined in polar coordinates as ($r2$; $\beta 2$) with $$\beta 1 = n\cdot\frac{\pi}{3},\ \beta 2 = \frac{\pi}{8} + n\cdot\frac{\pi}{3},$$

$$n = [1{:}nER/2]\ \text{base} = 1.85$$

$$r1 = distfactor * \text{base}^{2*\beta 1/\pi}$$

$$r2 = -distfactor * \text{base}^{2*\beta 2/\pi}$$

n=[1:nER/2]

wherein nER is a number of early reflection positions and distfactor is a constant.

8. The apparatus of claim 7, configured to determine the distfactor based on the at least one room acoustical parameter.

9. The apparatus of claim 7, configured to determine the distfactor such that the distfactor is the larger the larger the predelay time to the late reverberation is.

10. The apparatus of claim 7, configured to determine the nER based on the at least one room acoustical parameter.

11. The apparatus of claim 1, configured to read the at least one room acoustical parameter, from a bitstream comprising a representation of an audio signal to be rendered using the early reflection pattern.

12. The apparatus of claim 1, configured to determine a number of early reflection positions so that the number is larger the larger room dimensions are, or the number is larger the larger a room volume is, or the number is larger the larger a predelay time to a late reverberation is.

13. The apparatus of claim 1, configured to parametrize the one or more spiral functions and determine a number of early reflection positions so that a distance of a maximally distanced position among the early reflection positions to the listener position is larger the larger room dimensions are, or the larger a room volume is, or the larger a predelay time to a late reverberation is with the distance being smaller than the predelay time.

14. The apparatus of claim 1, configured to support a first determination of the early reflection pattern and a second determination of the early reflection pattern, wherein the first determination is different from the second determination and involves the parameterizing the one or more spiral functions centered at the listener position, and the placement of the early reflection positions using the one or more spiral functions, and select the first determination in case of the acoustic environment being an indoor environment or in case of a pattern type index in a bitstream comprising a representation of an audio signal to be rendered assuming a predetermined state.

15. The apparatus of claim 1, configured to determine the early reflection positions so that the early reflection positions lie in a horizontal plane along with the listener position.

16. The apparatus of claim 1, configured to determine the early reflection positions with adjusting an azimuthal rotation of the constellation according to a pattern azimuth parameter in a bitstream comprising a representation of an audio signal to be rendered.

17. A system for sound rendering, configured to receive first information on the listener position and a sound source position of a sound source; and render an audio signal of the sound source using a room impulse response whose early reflection portion is determined by the early reflection pattern which is indicative of the constellation of early reflection positions, and which is positioned at the listener position in a manner so that the early reflection positions are located around the listener position and at angular directions from the listener position which are invariant with respect to changes in listener head orientation, the system comprising the apparatus for determining the early reflection pattern according to claim 1.

18. The system of claim 17, further configured to generate a diffuse late reverberation portion of the room impulse response.

19. The system of claim 17, further configured to, in rendering the audio signal, generate a set of loudspeaker signals by forming a summation over direct sound contribution loudspeaker signals relating to a direct sound source portion of the room impulse response and early reflection contribution loudspeaker signals relating to the early reflection portion of the room impulse response.

20. The system of claim 17, further configured to generate early reflection contribution loudspeaker signals relating to the early reflection portion of the room impulse response by performing a rendition of the audio signal of the sound source from the early reflection positions.

21. The system of claim 20, further configured to, in generating the early reflection contribution loudspeaker signals relating to the early reflection portion of the room impulse response by performing the rendition of the audio signal of the sound source from the early reflection positions, render the audio signal of the sound source from each early reflection position in a manner level adjusted according to a distance of the respective early reflection position to the listener position.

22. The system of claim 21, further configured to, in rendering the audio signal of the sound source from each early reflection position in a manner level adjusted according to the distance of the respective early reflection position to the listener position, offset a level at which the audio signal of the sound source is rendered from the respective early reflection position, using a level offset, or amplify the level with a level factor, which offset or factor is common for all early reflection positions, and set the level offset or level factor according to an amplitude correction factor.

23. The system of claim 21, further configured to, in rendering the audio signal of the sound source from each early reflection position in a manner level adjusted according to the distance of the respective early reflection position to the listener position, modify the level adjustment according to the distance of the respective early reflection position to the listener position relative to a level adjustment used by the apparatus for rendering of the audio signal from the sound source positon according to a distance attenuation exponent.

24. The system of claim 20, further configured to, in generating the early reflection contribution loudspeaker signals relating to the early reflection portion of the room impulse response by performing the rendition of the audio signal of the sound source from the early reflection positions, render the audio signal of the sound source from each early reflection position in a manner spectrally shaped according to one or more frequency response parameters.

25. The system of claim 17, further configured to, in performing the rendition of the audio signal of the sound source from the early reflection positions, use Head Related transfer Functions (HRTFs) specific for a listener head orientation.

26. A non-transitory computer-readable storage medium including a bitstream configured for being subject to sound rendition according to the system of claim 17.

27. A method for determining an early reflection pattern for sound rendition, comprising receiving at least one room acoustical parameter which is representative of an acoustical characteristic of an acoustic environment; and determining an early reflection pattern which is indicative of a constellation of early reflection positions, by parameterizing one or more spiral functions centered at a listener position, and placing the early reflection positions using the one or more spiral functions.

28. A method for sound rendering, comprising receiving first information on the listener position and a sound source position of a sound source; and rendering an audio signal of the sound source using a room impulse response whose early reflection portion is determined by the early reflection pattern which is indicative of the constellation of early reflection positions, and which is positioned at the listener position in a manner so that the early reflection positions are located around the listener position and at angular directions from the listener position which are invariant with respect to changes in listener head orientation, the method comprising the method for determining the early reflection pattern according to claim 27.

29. A non-transitory digital storage medium having stored thereon a computer program for performing a method for sound rendering, comprising receiving first information on the listener position and a sound source position of a sound source; and rendering an audio signal of the sound source using a room impulse response whose early reflection portion is determined by the early reflection pattern which is indicative of the constellation of early reflection positions, and which is positioned at the listener position in a manner so that the early reflection positions are located around the listener position and at angular directions from the listener position which are invariant with respect to changes in listener head orientation, the method comprising the method for determining the early reflection pattern according to claim 27, when the computer program is run by a computer.

30. A non-transitory digital storage medium having stored thereon a computer program for performing a method for determining an early reflection pattern for sound rendition, comprising receiving at least one room acoustical parameter which is representative of an acoustical characteristic of an acoustic environment; and determining an early reflection pattern which is indicative of a constellation of early reflection positions, by parameterizing one or more spiral functions centered at a listener position, and placing the early reflection positions using the one or more spiral functions, when the computer program is run by a computer.

* * * * *